US012611852B2

(12) United States Patent
Bachon et al.

(10) Patent No.: US 12,611,852 B2
(45) Date of Patent: Apr. 28, 2026

(54) AGEING-RESISTANT SEALING SHEET

(71) Applicant: Ewald Dörken AG, Herdecke (DE)

(72) Inventors: Thomas Bachon, Düsseldorf (DE);
Ronald Flaig, Leverkusen (DE);
Carsten Harfmann, Frankfurt (DE);
Rüdiger Laur, Dortmund (DE);
Yvonne Weeke, Essen (DE)

(73) Assignee: EWALD DÖRKEN AG, Herdecke
(DE)

( * ) Notice: Subject to any disclaimer, the term of this
patent is extended or adjusted under 35
U.S.C. 154(b) by 246 days.

(21) Appl. No.: 18/264,786

(22) PCT Filed: Dec. 16, 2021

(86) PCT No.: PCT/EP2021/086218
§ 371 (c)(1),
(2) Date: Aug. 9, 2023

(87) PCT Pub. No.: WO2022/171338
PCT Pub. Date: Aug. 18, 2022

(65) Prior Publication Data
US 2024/0051278 A1      Feb. 15, 2024

(30) Foreign Application Priority Data
Feb. 9, 2021      (DE) ..................... 10 2021 103 033.1

(51) Int. Cl.
B32B 27/12      (2006.01)
B29C 48/07      (2019.01)
(Continued)

(52) U.S. Cl.
CPC .............. B32B 27/12 (2013.01); B29C 48/07
(2019.02); B29C 48/154 (2019.02); **B29C
48/21 (2019.02); B32B 5/022 (2013.01); B32B
7/12 (2013.01); B32B 27/40 (2013.01); B29K
2067/00 (2013.01); B29K 2075/00** (2013.01);
B29K 2713/02 (2013.01); B29K 2995/0065
(2013.01); B29K 2995/0069 (2013.01); **B29K
2995/0097 (2013.01); B32B 2255/02**
(2013.01);
(Continued)

(58) Field of Classification Search
None
See application file for complete search history.

(56) References Cited

U.S. PATENT DOCUMENTS

2020/0399903 A1* 12/2020 Vido ....................... B32B 27/12

FOREIGN PATENT DOCUMENTS

DE      102015000092 A1      4/2016
EP          3002382 A1      4/2016
(Continued)

OTHER PUBLICATIONS

Machine translation of WO2020088853 (Year: 2020).*
(Continued)

*Primary Examiner* — Shawn Mckinnon
(74) *Attorney, Agent, or Firm* — Andrus Intellectual
Property Law, LLP

(57) ABSTRACT

A high-ageing-stable planar sheet for the building sector and
to the use of a high-ageing-stable planar sheet in the building
sector, in particular as a sarking sheet, underlay sheet and/or
sheathing sheet in a roof construction and/or a façade sheet
in a wall construction.

12 Claims, 4 Drawing Sheets

(51) Int. Cl.

| | |
|---|---|
| *B29C 48/154* | (2019.01) |
| *B29C 48/21* | (2019.01) |
| *B29K 67/00* | (2006.01) |
| *B29K 75/00* | (2006.01) |
| *B32B 5/02* | (2006.01) |
| *B32B 7/12* | (2006.01) |
| *B32B 27/40* | (2006.01) |
| *E04D 12/00* | (2006.01) |

(52) U.S. Cl.

CPC ... *B32B 2255/26* (2013.01); *B32B 2262/0253* (2013.01); *B32B 2262/124* (2021.05); *B32B 2274/00* (2013.01); *B32B 2307/54* (2013.01); *B32B 2307/718* (2013.01); *B32B 2307/7265* (2013.01); *B32B 2307/734* (2013.01); *B32B 2307/7376* (2023.05); *B32B 2419/06* (2013.01); *E04D 12/002* (2013.01)

(56) References Cited

FOREIGN PATENT DOCUMENTS

| WO | 202008853 | A1 | | 1/2020 |
|---|---|---|---|---|
| WO | 2020088851 | A1 | | 5/2020 |
| WO | WO2020088853 | | * | 5/2020 |
| WO | 2021009272 | A1 | | 1/2021 |
| WO | 2022171338 | A1 | | 8/2022 |

OTHER PUBLICATIONS

International Search Report and Written Opinion issued in corresponding PCT Application No. PCT/EP2021/086218, mailed Mar. 3, 2022.

* cited by examiner

AGEING-RESISTANT SEALING SHEET

CROSS REFERENCE TO RELATED APPLICATION

The present application is the U.S. national stage application of international application PCT/EP2021/086218 filed Dec. 16, 2021, which international application was published on Aug. 18, 2022, as International Publication WO 2022/171338. The international application claims priority to German Patent Application No. 10 2021 103 033.1 filed Feb. 9, 2021. The international application and the German application are hereby incorporated herein by reference in their entireties.

FIELD

The present invention relates to the technical field of building materials.

SUMMARY

In particular, the invention relates to a highly aging-resistant flat sheet for the construction sector.

Furthermore, the present invention relates to the use of a highly aging- resistant flat sheet in the construction sector, in particular as a sarking sheet, underlayment sheet and/or sheathing sheet in a roof structure and/or facade sheet in a wall structure.

In addition, the present invention relates to a method for the producing of highly aging-resistant flat sheets for the construction sector.

Finally, the present invention relates to a method for determining the aging stability of flat sheets for the construction sector.

BRIEF DESCRIPTION OF THE DRAWINGS

The present disclosure is described with reference to the following drawings.

It shows the figure representations according to

DETAILED DISCLOSURE

Figure 1:
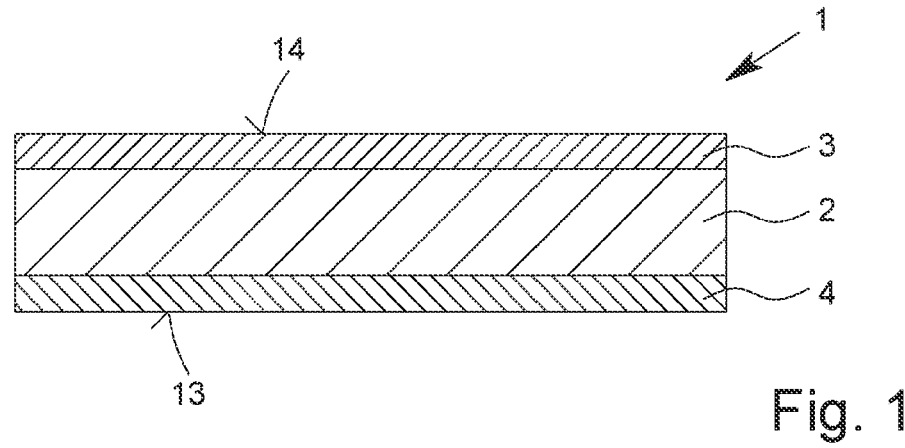
FIG. 1 a schematic cross-sectional view of a flat sheet according to the invention.

Flat sheets, such as covering, facade or also under-roof sheets, which are used in particular in the construction sector and/or in the construction industry, are usually used to protect buildings, building materials and/or to cover, in particular, buildings. In addition, such membranes can also be used in other areas, for example in agriculture, as geotextiles and/or in the packaging industry.

In general, the sheets in question serve to preserve the value of goods, in particular buildings and/or building materials. For example, the sheet can be used for protection against the weather, in particular for protection against rain, snow, moisture, cold, heat and/or wind. Consequently, the sheets in question can also be understood as protective sheets and/or films.

An important property of the sheets in question is their resistance to external environmental influences, especially in the form of weathering, as listed above. Sheets whose resistance to these influences is inadequate generally have a comparatively short service life and/or low durability and aging stability. Low durability and/or aging stability can ultimately be expressed in the form of material changes that resemble fatigue phenomena, for example, so that corresponding sheets become brittle, porous, cracked and/or, in particular, leaky, e.g. against penetration of moisture and/or water.

However, especially with regard to sheets intended for use on, in or on buildings and roofs, it is not acceptable if they age unexpectedly and/or prematurely and subsequently fail, e.g. after only a few years. If moisture penetrates into the roof or building as a result, the period until the damage is detected is usually very long. The penetrating moisture can thus cause damage that is usually only noticed when the damage becomes visible, especially inside the building, for example in the form of water stains on the building walls. Such a water stain as a reason for repair then often reveals that far more areas of the building are damaged than just the wall showing the water stain. To repair the damage, the building envelope must be exposed, at least in some areas, in order to find the damaged area, which usually involves a great deal of effort and therefore very high costs. Accordingly, it is of central importance and particularly desirable for the sheets in question that the sheets used have reliable and flawless durability in the range of several years and preferably decades.

The durability of sheets, especially for the building sector, is usually determined in accordance with the standard DIN EN 13859-1-2010-11. As part of this normative durability test, an aging simulation is first carried out, wherein the sheet in question is exposed to UV radiation, which is intended to simulate the duration until the sheet is installed and/or covered in the building and/or roof. For this purpose, the sheet is irradiated for 336 hours with UV light with an energy per unit area of 55 $MJ/m^2$. In addition, the long-term stability of the sheet is estimated by warm storage at 70° C. over a period of 90 days. According to the standard, the hot storage should be carried out in the presence of as little air flow as possible in order to avoid any impairment of the performance characteristics of the product to be tested.

Sheets that are still intact, i.e. essentially watertight, after these two aging simulation methods should exhibit a high resistance to aging.

In practice, however, it has been shown that a number of sheets which have passed the above test procedure without any objections fail prematurely, irrespective of the test results, and have a significantly lower durability than simulated and/or certified. This is particularly evident in connection with applications in which the corresponding membranes are increasingly exposed to strong air movements.

However, in some applications, e.g. in roof constructions as a sarking and/or underlayment membrane, it is desirable and/or necessary that intensive air movements are possible, e.g. to expel moisture from the roof construction, and that the sheets used in this context nevertheless withstand the application conditions as undamaged as possible, in particular over a long period of time, i.e. several years, and without any loss of performance.

The premature failure of corresponding sheets is accordingly problematic, since on the one hand it would first have to be recognized, especially in good time, that an installed sheet is prematurely outdated and thus no longer perfectly functional, and on the other hand an unexpected and cost-intensive replacement of the sheet would have to be carried out in order to prevent possible damage to the roof and/or building. However, as explained above, the problem situation is often multiplied many times over, since such a material deficiency often remains undetected until visible and thus already major damage has occurred to the building, which is then all the more time-consuming, labor- intensive and costly to repair.

Against this background, there continues to be a need for aging-resistant sheets, especially for use in the construction sector, which are actually and/or reliably resistant to aging for longer periods of time and are thus highly resistant to aging.

There is also a need for a reliable method of checking the durability and/or aging resistance of the sheets concerned, which in particular ensures that sheets which show a high aging resistance in the simulation actually have it.

It is thus an object of the present invention to overcome the problems and disadvantages associated with the prior art described above, or at least to mitigate them.

In particular, one object of the present invention is to provide a flat sheet which is characterized by superior aging properties and/or durability compared to prior art sheets and/or films.

In addition, a further object of the present invention is to provide a method which enables a more reliable and precise determination and/or verification of the aging stability of flat sheets, in particular for the construction sector.

Thus, subject matter of the present invention according to a first aspect of the present invention is a highly aging-resistant flat sheet for the construction sector with further advantageous embodiments of this aspect of the invention also discussed herein.

Further subject matter of the present invention according to a second aspect of the present invention is the use of a highly aging stable flat sheet in the construction sector.

A further subject matter of the present invention according to a third aspect of the present invention is a method for producing a highly aging-resistant flat sheet for the construction sector.

Finally, subject matter of the present invention according to a fourth aspect of the present invention is a method for determining the aging stability of flat sheets for the construction sector with further advantageous embodiments of this aspect of the invention also discussed herein.

It goes without saying that particular embodiments mentioned below, which are described only in the context of one aspect of the invention, are also applicable to the other aspects of the invention, without this needing to be explicitly mentioned.

Furthermore, it should be noted with respect to all relative or percentage, in particular weight-related, indications of amounts mentioned below that, within the scope of the present invention, these are to be selected by the person skilled in the art in such a way that, in the sum of the ingredients, additives or adjuvants or the like, 100% or 100 wt. % always results. However, this is self-evident for the person skilled in the art.

In addition, it applies that all parameter data or the like mentioned in the following can basically be determined or ascertained with standardized or explicitly stated determination methods or with determination methods that are familiar to the person skilled in the art.

With this proviso made, the subject-matter of the present invention will be explained in more detail below.

Thus, the subject matter of the present invention-according to a first aspect of the present invention—is a highly aging-resistant flat sheet for the construction sector, having a multilayer structure comprising at least a first nonwoven layer and a second nonwoven layer, and at least one membrane layer arranged between the nonwoven layers, the membrane layer being in the form of a monolithic membrane layer and comprising or consisting of a thermoplastic elastomer selected from the group consisting of thermoplastic polyurethanes and/or thermoplastic copolyesters (TPEE), and the first and/or the second nonwoven layer having a weight per unit area of between 10 and 150 $g/m^2$, wherein the sheet has an aging stability of at least 15 years, wherein the aging stability is determined by subjecting the sheet to an artificial aging process, wherein the artificial aging process is carried out at a temperature of 70±2° C. and an air velocity of 5±2 m/s, and wherein, following the artificial aging process, the water resistance of the sheet is tested in accordance with DIN EN 13859-1-2010-11, section 5.2.3, against a water column of at least 200 mm over a period of 2 h.

For, as applicant has surprisingly found, flat sheets with the features and/or properties provided for in accordance with the invention are characterized by a particularly high aging stability, which is resilient and reliably confirmed by means of an artificial aging process with subsequent watertightness testing. In particular, the nonwoven layers provided for sheets according to the invention exhibit a special resistance and durability to environmental or, in particular, weather-related influences. Thus, in an advantageous manner, the membrane layer, which is arranged between the first and the second nonwoven layer and is preferably decisive for the functional properties of the sheet, can then also be reliably maintained for a long period, in particular of several years and/or preferably decades.

In this sense, the high aging stability of sheets according to the invention can be attributed in particular at least substantially to the advantageous structure of the sheets. The sheet according to the invention has, in particular due to the nonwoven layers provided, the high aging stability aimed at and/or provided for according to the invention, wherein the long service life and/or high aging stability of the sheet according to the invention is determined and/or confirmed specifically by means of the aging simulation carried out.

The present invention is based on the surprising realization of the applicant that the aging stability and durability of the sheets in question can be determined more reliably, more precisely and in a more application-related and application-specific manner than has been known and/or carried out to date if, in addition to the aspect of increased temperature, the influence of the air movement on the surface of the flat sheet is also taken into account in the artificial aging simulation.

In particular, the speed with which the air movement occurs on the sheet surface is decisive. This aspect is not sufficiently taken into account in the previous normative aging process according to DIN EN 13859-1-2010-11, so that on the basis of this DIN standard or the normative aging simulation provided for accordingly, partly insufficient knowledge or results are obtained with regard to the aging stability of sheets or films for the construction sector.

In particular, it has been found that sheets and/or construction or protective films which comply with the standard DIN EN 13859-1-2010-11 usually fatigue prematurely and/or age prematurely under the artificial aging conditions provided for in the invention and consequently fail. Accordingly, it is also observed in practice and/or in use that the durability and long-term resistance of these sheets and/or films is much less pronounced than would have been expected with regard to the DIN test passed. This therefore means, on the one hand, that the durability and/or long-term resistance or aging stability of corresponding sheets is not sufficiently given and, on the other hand, that the aging simulation within the framework of the DIN EN 13859-1-2010-11 standard is not so mature that reliable and effective conclusions can be drawn for the results obtained with regard to their properties.

In contrast, the present invention provides both an advantageous method for determining and/or checking the durability and/or aging stability of flat sheets for the construction sector and a corresponding product with correspondingly improved properties compared to conventional sheets of the prior art. The sheets according to the invention are characterized in particular by advantageous aging stability and can in this sense be described as highly stable to aging, as confirmed by means of the aging process carried out and the subsequent, in particular successfully performed and/or passed, water tightness test. The watertightness of sheets, as provided by the present invention, can be regarded as one of the most decisive properties of the sheets, which should be retained to the greatest possible extent even after a period of use of several years, e.g. as a sub roofing or facade sheet.

In addition to high aging stability, sheets according to the invention also have very good hydrolysis stability and/or resistance. The hydrolytic stability of sheets according to the invention can be determined and/or confirmed by storing the sheets at 70° C. and 90% relative humidity in a climatic oven, in particular over a period of 12 weeks, preferably 24 weeks, and subsequently testing the water tightness of the films. It is further preferred that the sheets according to the invention withstand, among other things, a dynamic water column of more than 3 m, in particular more than 5 m.

Last but not least, the sheets according to the invention are also characterized by very good stability in the presence of moisture and low outdoor temperatures. This particular weather stability is both important and a significant advantage of sheets according to the invention, since sheets such as those proposed by the present invention may be exposed to rain, sleet or melting snow during the winter installation phase. To test weather stability, the sheets are stored outdoors uncovered and on rafters during the winter weather period, and the water tightness and bond adhesion of the sheet is determined following the storage period.

The present invention thus provides a product which advantageously increases the safety and reliability with regard to the resistance and durability of roof and/or facade constructions. Since the product according to the invention has an aging stability of at least 15 years, which has been reliably established and/or confirmed, it can be safely assumed that the sheet in question will not fail prematurely and/or age prematurely both under conventional and/or typical regional weather conditions and under harsher or more extreme weather conditions.

The high resistance to aging of the sheets according to the present invention, which has been ensured and reliably verified, can be attributed—without wanting to bebound to this theory—to observations of the applicant according to which sheets according to the present invention are significantly less susceptible to oxidation processes which can occur as a result of the action of atmospheric oxygen and, in part, UV radiation. Above all, the sheets according to the invention show an increased resistance to oxidation processes, especially under conditions where there is a high degree of air movement and increased air velocities on the sheet surface.

In contrast, it has been shown for prior art sheets comparable in terms of structure, i.c. in particular sheets with a nonwoven-membrane-nonwoven structure, that these are stable to elevated temperatures in the aging simulation, but cannot withstand conditions under which the sheets are exposed to high temperatures and intensive air movement at the same time. The premature aging of the known sheets could be clearly attributed to an excessive, especially superficial, oxidation of components of the sheets, which ultimately dissolved the structural integrity of the sheets and made them cracked, porous, brittle and impervious to water and thus unusable.

These negative, weather-induced effects can be significantly mitigated with the sheet according to the invention, in particular over a reliably determinable and correspondingly demonstrably guaranteed period of at least 15 years.

In the context of the present invention, it has proven useful if the flat sheet is designed as a sarking sheet, underlayment sheet and/or sheathing sheet in a roof structure and/or facade sheet in a wall structure.

It is preferred in the context of the present invention if the sheet has an aging stability of at least 20 years, in particular at least 25 years. Even more preferably, it may be provided that the shect has an aging stability in a range of 15 to 75 years, in particular 20 to 60 years, preferably 25 to 50 years. Thus, the sheets provided by the present invention can be described as highly aging resistant and/or stable and durable. Therefore, the present invention also makes a particularly valuable and advantageous contribution to increasing both efficiency and safety in the construction sector with the sheets according to the invention.

In order to determine and/or confirm the high aging stability aimed at according to the invention, it is preferably provided in the context of the present invention that the artificial aging process for determining the aging stability is carried out over a period of at least 37 weeks.

In this respect, as well as with regard to the effect of the artificial aging process, it has been found in particular in the context of the present invention that the sheet ages in the artificial aging process by four to five months, in particular by 4.5 months, in one week. Likewise, it can also be assumed that the sheet ages by one year in the artificial aging process in two to three weeks, in particular in 2.5 weeks. Thus, there is a comparatively precise and, in particular, linear correlation between the desired or intended aging stability of a sheet and the duration of the implementation of the artificial aging process, on the basis of which, in particular, it is also possible to adapt and/or extend the scope of determination and/or confirmation of the aging stability of a sheet according to the invention.

In this sense, it is thus preferably provided in the context of the present invention that the duration of the implementation of the aging process is determined in weeks as a function of the targeted aging stability of the sheet in years. Good and reliable results are thus obtained in the context of the present invention if the artificial aging process is carried out, for example, for a sheet according to the invention having a targeted and/or envisaged aging stability of at least 15 years, for a duration of at least 30 weeks, in particular at least 36 weeks, preferably at least 40 weeks, more preferably at least 48 weeks, particularly preferably at least 64 weeks, under the aforementioned temperature conditions and in the presence of the aforementioned air velocities.

Thus, the duration in weeks for performing the artificial aging process can be determined directly based on the correlation of the given aging stability and aging during the aging process under the artificial aging conditions as mentioned before.

In this sense, it is therefore possible to directly multiply the number of years envisaged or specified for the aging stability of the sheet in question by a factor in the range of 2 to 3, preferably the factor 2.5, in order to conclude the number of weeks over which the artificial aging process is preferably to be carried out for the sheet in question. Alternatively, it is also possible to first convert the desired aging stability in years into months, i.e. to multiply it by a factor of 12, and to divide the product obtained from this by a value of 4 to 5, in particular 4.5, which in turn gives the number of weeks over which the artificial aging process according to the invention is preferably to be carried out.

Accordingly, for example, for sheets which exhibit a higher aging stability, in particular of at least 20 or at least 25 years, the artificial aging process should be carried out over a period of preferably at least 40 and/or at least 50 weeks, preferably at least 48 and/or at least 60 weeks, in order to safely and reliably test and confirm the correspondingly targeted aging stability.

With regard to the further procedure for determining and/or confirming the aging stability of sheets according to the invention, it has proved advantageous in the context of the present invention if the artificial aging process is carried out in an oven, in particular an oven with a design based on the EN 1296-2001-03 standard. In this context, it is decisive that the furnace in which the artificial aging process is carried out is in particular designed for the temperatures and air velocities for artificial aging provided according to the present invention. Accordingly, the furnace can also deviate from the aforementioned standard in this respect and, for example, be designed in particular for the generation of higher air velocities.

Furthermore, within the scope of the present invention, particularly good, i.e. reliable and resilient, results are obtained if the artificial aging process in the oven is carried out in such a way that the air in the oven is exchanged regularly, in particular at least 5 times per hour, preferably 7 times per hour, preferably 10 times per hour. In this way, for example, an accumulation in the furnace atmosphere of any volatile material constituents that may have been expelled from the sheet can be avoided. Likewise, the oxygen content and correspondingly the oxidation potential can be kept constant under the artificial aging conditions, so that overall it is advantageously ensured that, within the scope of the present invention, reliable results are obtained with respect to the aging resistance of sheets according to the invention.

Furthermore, with regard to testing the watertightness of the sheet according to the invention, in particular one that has been artificially aged beforehand, it has proved advantageous in this context if the watertightness test is carried out-in addition to the standard DIN EN 13859-1-2010-11—in conjunction with the standard DIN EN ISO 811-2018-08, in particular with the watertightness test being carried out without a cover plate or cover sheet and limited to an area of 100 cm² of the flat sheet.

In this context, it is a further advantage of the present invention that the verification and/or confirmation of the high aging stability of sheets according to the invention can be carried out efficiently and on the basis of standardized methods, so that the aging stability of sheets according to the invention can be determined and/or proven unambiguously, reliably and reproducibly, in particular also in comparison with other and/or less aging-resistant sheets of the prior art.

As far as the structure of the sheet is concerned, against the background of the advantageous, high aging stability of the flat sheet according to the invention, this can generally be varied and/or adapted depending on the intended application or expected application conditions. In the context of the present invention, however, it has likewise been found in an advantageous manner that the structure of flat sheets according to the invention-described in more detail below-in particular influences and/or establishes the desired and/or achieved aging stability of the sheet, preferably to a significant extent.

In the context of the present invention, it is first of all preferably provided that the first nonwoven layer and/or the second nonwoven layer is arranged externally. It is thus particularly preferred, in the context of the present invention, if at least one of the two nonwoven layers provided forms at least one outer surface of the flat sheet according to the invention. In contrast, it is even more advantageous, in particular with respect to the aging stability of the sheet according to the invention, if the first nonwoven layer and the second nonwoven layer each form an outer surface of the flat sheet according to the invention.

Since the nonwoven layers preferably form the outer surfaces of the sheet according to the invention, it can also be envisaged for the application, in particular in the construction sector, e.g. as a sub roofing or facade sheet, that e.g. the first nonwoven layer forms the top side of the sheet according to the invention and the second nonwoven layer forms the underside of the sheet according to the invention. In this context, the top side corresponds in particular to the side facing the weather in the case of use, while the underside of the sheet according to the invention is preferably on the side facing away from the weather in the case of use.

In this sense, the high aging stability of sheets according to the invention is, in particular, decisively due, among other things, to the first nonwoven layer and/or the second nonwoven layer, in particular the first nonwoven layer, which preferably forms the top side of the sheet in the application and/or faces the weather.

Accordingly, it is also preferably provided in the context of the present invention that the first nonwoven layer and/or the second nonwoven layer, in particular the first nonwoven layer, is characterized by a particular resistance and durability to external environmental influences, in particular environmentally induced weathering influences, preferably oxidizing environmental weathering influences, in particular these advantageous properties being based at least essentially on the choice of materials and also the processing of the selected materials to form the nonwoven layers for sheets according to the invention.

In the context of the present invention, a sheet, layer or sheet layer is to be understood as an almost two-dimensional flat structure. Such flat structures are usually sheet-shaped and thus have only two faces, in particular surfaces, i.e. the layer thickness of the respective sheet layer, layer or sheet is negligible compared to the areal extent of the latter.

To ensure the high aging stability of sheets according to the invention, it has also proved advantageous in the context of the present invention if the first nonwoven layer and/or the second nonwoven layer is formed as a spunbonded nonwoven and/or as a needled nonwoven.

In particular, it has further proved useful in the context of the present invention if the first nonwoven layer and/or the second nonwoven layer is formed as a mechanically, chemically and/or thermally, preferably thermally, consolidated nonwoven layer. Preferably, the first nonwoven layer and/or the second nonwoven layer is formed as a thermally consolidated or needle-jet or wet-jet consolidated nonwoven layer.

Since the nonwoven layer in particular ensures the mechanical properties of the flat sheet and also provides protection for the membrane layer enclosed between the nonwoven layers, the influence of the nonwoven layers on the aging stability of the sheet according to the invention can in particular be regarded as at least substantially extensive and/or decisive. By preferably using specially bonded nonwovens within the scope of the present invention, for example, a high resistance of the nonwoven layers can be achieved, in particular to mechanical stress, such as is caused, for example, by prolonged wind action and/or the action of constant air movement on the sheet. At the same time, a particularly consolidated and/or compacted structure, in particular a fiber structure, of the nonwoven layers also permits a certain blocking effect against the penetration of, for example, damaging UV radiation.

The first nonwoven layer and/or the second nonwoven layer can furthermore be formed both identically to one another and differently from one another, in particular, for example, with regard to the grammage and/or the weight per unit area, the material composition and/or the formation of nonwoven and/or fiber in the nonwoven. An identical formation of the nonwovens is to be understood in particular in such a way that the nonwovens have the same surface properties, the same material and/or the same material composition and/or the same grammage. In particular, the first and second nonwoven layers can also have identical functions, especially where the weight per unit area of the identical nonwoven layers differs from one another by less than 5 g/m².

Particularly good results are obtained according to the invention if the weight per unit area of the first and/or the second nonwoven layer is between 20 g/m² and 120 g/m², preferably 30 g/m² and 100 g/m², particularly preferably 50 to 80 g/m². The grammage of the nonwoven layers is selected in such a way that the required properties of the sheet, in particular with regard to elasticity, stability, tear resistance and/or tear propagation resistance of the sheet, can still be adequately ensured with the lowest possible total weight per unit area of the flat sheet. This means that the nonwoven layers, which can also be referred to as protective and/or carrier layers, can also be used to provide mechanical protection for the membrane layer.

Good results are also achieved within the scope of the present invention if the first nonwoven layer and/or the second nonwoven layer has a layer thickness in the range from 0.01 mm to 2.5 cm, in particular 0.05 mm to 1.5 cm, preferably 0.1 mm to 1 cm. A high durability and robustness and/or resistance of the nonwoven layers can thus be achieved with respect to the sheet according to the invention on the basis of comparatively thin as well as thicker nonwovens. In the context of the present invention, particularly good results are obtained when the layer thickness of the nonwoven layer and/or layers is adjusted in coordination with other factors influencing the properties of the nonwoven layer and/or layers, for example, taking into account the degree of bonding of the nonwovens or the underlying material selection. For example, with a high degree of bonding and/or grammage of the nonwoven, the thickness of the nonwoven layer can be reduced and at the same time an advantageous resistance or durability of the nonwoven can be achieved.

Furthermore, with regard to the nature of the first nonwoven layer and/or second nonwoven layer and, in particular, of the nonwovens comprised therein, the nonwovens of the first and/or second nonwoven layer used in the context of the present invention are typically formed from fibers, in particular, for example, continuous fibers, in particular when the first and/or second nonwoven is in the form of a spunbonded nonwoven.

With regard to the properties of the fibers, it has initially proved useful if the fiber has a diameter in the range from 1 to 50 μm, preferably from 5 to 30 μm, particularly preferably from 8 to 20 μm. In addition to the fiber thickness, the properties of the fiber and thus of the resulting nonwoven or nonwoven layers as a whole are also influenced in particular by the choice of material and the properties of the components from which the fiber is formed. In particular, based on the fiber thickness, especially in interaction with the material selection as well as nonwoven processing, a high durability of the fiber and accordingly also of the nonwoven or nonwoven layers obtained therefrom can be achieved. Fibers with the aforementioned diameters have proven to be particularly suitable for this purpose.

Furthermore, it is preferably provided in the context of the present invention that the first nonwoven layer and/or the second nonwoven layer comprise fibers of one component or multiple components. Thus, in this sense, it is preferred in the context of the present invention if the first and/or the second nonwoven layer comprises monocomponent fibers, i.e. fibers comprising only one component, or bicomponent and/or multicomponent fibers, in particular bicomponent fibers, i.e. fibers comprising at least two components.

According to the invention, particularly good results are obtained when monocomponent fibers are used and/or contained in the nonwoven layers. In this way, within the scope of the present invention, nonwoven layers can be provided in a cost- effective manner which are characterized by a uniform and consistently pronounced property profile, so that with regard to the sheet according to the invention, it can be ensured over the entire sheet that in particular the intended advantageous aging properties, i.c. a high durability and resistance of the fibers or nonwoven layers, are uniformly and reliably pronounced.

With respect to the choice of material for the fiber component and/or fiber components, it has proven useful in the context of the present invention if the one fiber component and/or the plurality of fiber components contains one or more polymers, in particular from the group of thermoplastics, preferably from the group of polyolefins, polyesters, polyamides, and/or thermoplastic polyurethanes, preferably from the group of polyolefins, polyesters, and/or thermoplastic polyurethanes.

In particular, it may be provided in the context of the present invention that the thermoplastic material is selected from the group of polyolefins homopolymers, in particular polyethylene, polypropylene, polybutylene, polyhexylene, preferably polyethylene, polypropylene, the group of polyolefin copolymers, in particular ethylene copolymers, propylene copolymers, butylene copolymers, hexylene copolymers, preferably ethylene copolymers, propylene copolymers, and blends and/or mixtures thereof.

In this context, copolymer means a polymer prepared from at least two different types of monomers, where the mass fraction of the monomer that is decisive for the designation of the copolymer is at least 50%.

According to the invention, it is particularly preferred if the thermoplastic is selected from the group of polyolefins comprising polyethylene, polypropylene, ethylene copolymers, propylene copolymers, and mixtures and/or blends thereof. Furthermore, very good results are obtained within the scope of the present invention, in particular, when the thermoplastic is selected from the group of polyolefins comprising polypropylene, propylene copolymers, and mixtures or blends thereof. Excellent aging stability is observed for corresponding fibers or, in particular, nonwoven layers, especially if the nonwoven layers have also been consolidated, for example, as described and/or have the preferred layer thicknesses and/or fiber diameters mentioned above.

It is entirely surprising that within the scope of the present invention, in particular in the case of the use of monocomponent fibers, preferably from the aforementioned preferred components and/or polymers, nonwoven layers and ultimately sheets can be obtained which achieve the excellent aging stabilities according to the invention. This does not usually apply to prior art sheets, which have an allegedly similar structure to sheets according to the invention. Rather, there are relevant differences between the known prior art sheets and the sheet described according to the invention. These differences, i.e. above all the advantageous aging stability achieved according to the invention, result-without wishing to commit to this—in particular as a result of combined and/or synergistically acting effects for the sheet according to the invention, these effects being attributable to the advantageous interaction of, for example, sheet construction, material selection, material properties and/or processing of the sheet according to the invention. The sheet according to the invention preferably consists of known materials or combinations of materials, the individual materials being matched to one another in such a way that they exhibit the increased and/or improved aging resistance. Prior art sheets are usually designed to meet the water resistance test according to DIN EN 13859-1-2010-11, i.c. irradiation and UV light for 336 hours and storage at 70° C. for 90 days, but not the additional conditions according to the present invention.

In the case of the alternativly preferred embodiment of the present invention, according to which the one fiber component and/or the plurality of fiber components is selected from a thermoplastic plastic from the group of polyesters, it has proved useful if the thermoplastic plastic is selected from the group of polyesters from polyethylene terephthalate, polybutylene terephthalate, polytrimethylene terephthalate, polyethylene furanoate, copolymers thereof and mixtures and/or blends thereof or blends thereof, in particular polyethylene terephthalate, polybutylene terephthalate, polyethylene furanoate, copolymers thereof and mixtures and/or blends thereof, preferably polyethylene terephthalate, polyethylene furanoate, copolymers thereof and mixtures and/or blends thereof.

In particular, the aforementioned polyesters can be obtained from at least substantially 100% recycled and/or renewable raw materials, whereby a high degree of ecological compatibility can additionally be achieved. Furthermore, the use of polyesters for the fiber components can also be suitable because the fibers obtained accordingly are characterized by a comparatively high hardness and/or robustness and toughness, which in turn ultimately has a positive effect on the aging stability of the sheet according to the invention.

In case that thermoplastic polyurethanes should be selected as thermoplastics for the one fiber component and/or the multiple fiber components, it has proven advantageous in the context of the present invention if the thermoplastic plastic from the group of thermoplastic polyurethanes is selected from the group of aliphatic and/or aromatic polyurethanes, in particular of the ether type, the ester type, the carbonate type and their mixtures and/or blends, in particular the aliphatic and/or aromatic polyurethanes of the ether type, ester type and their mixtures and/or blends, preferably the aliphatic and/or aromatic polyurethanes of the ether type, ester type and their mixtures and/or blends, preferably the aliphatic and/or aromatic polyurethanes of the ether type.

In the context of the present invention, a thermoplastic polyurethane is to be understood as a thermoplastic elastomer which is at least essentially formed from polyurethane and/or comprises monomers with urethane repeating units.

Thermoplastic elastomers, such as thermoplastic polyurethane (TPU), exhibit elastomeric behavior at room temperature, but when heat is applied, they exhibit thermoplastic behavior. A particular advantage of thermoplastic elastomers is that, compared to pure elastomers, they can be reversibly formed at any time by the influence of heat. An elastomeric behavior of the polymer of the fiber component can have an advantageous effect on the mechanical properties of the nonwoven based thereon, in particular since the nonwovens and/or nonwoven layers obtained have a comparatively high resilience and/or elasticity, which can be advantageous with regard to the constant action of air movements in the application. In particular, nonwoven layers of this type are able to withstand and tolerate oscillating and fluttering movements well in relation to one another, which in turn ultimately benefits the aging resistance of the sheet according to the invention.

Thermoplastic polyurethane is also characterized by a high bondability, so that nonwoven layers can be obtained which have a comparatively high bond strength. Corresponding nonwoven layers and sheets obtained from them can therefore be regarded as particularly stable under mechanical stress.

Good bondability in this sense means that the mobility of the fibers in the nonwoven can be adjusted as defined as possible during the bonding of the fibers during the production of a nonwoven. The specific adjustment of the mobility of the fibers in the nonwoven, which depends on the strength of the bond between the fibers, is the prerequisite for producing a nonwoven with high specific tensile strength and simultaneously high specific nail pull-out force.

In the context of the present invention, an ether-type thermoplastic polyurethane and/or an ether TPU means a thermoplastic polyurethane whose soft segment is composed of polyethers. These polyethers are thereby preferably obtainable from polyether alcohols, in particular with hydroxy functionality 2, i.c. from diols. The polyether alcohols, in particular the polyether diols, are usually obtained by polymerization of short-chain precursors, in particular, for example, by anionic polymerization with alkali hydroxides, such as sodium or potassium hydroxide, or alkali alcoholates, such as sodium methylate, sodium or potassium ethylate or potassium isopropylate as catalysts, or by cationic polymerization with Lewis acids, such as antimony pentachloride, boron fluoride etherate, as catalysts from one or more alkylene oxides or cyclic ethers with preferably 2 to 4 carbon atoms in the alkylene radical. Particularly suitable compounds for polymerization include tetrahydrofuran, 1,3-propylene oxide, 1,2-and 2,3-butylene oxide, 1,4-butylene oxide, ethylene oxide and 1,2- propylene oxide. The alkylene oxides can be used individually, alternately or as a mixture in the polymerization.

Depending on the number of carbon atoms in the chain between the ether functionalities of the alkylene radical, thermoplastic ether polyurethanes are subdivided, with $C_2$-ether polyurethanes, $C_3$-ether polyurethanes and $C_4$-ether polyurethanes being the most widely used. $C_2$-ether polyurethanes are obtainable, for example, by polymerizing ethylene oxide, 1,2-propylene oxide, 1,2-and 2,3-butylene oxide. $C_3$-ether polyurethanes arc obtainable, for example, by polymerization of 1,3-propylene oxide. $C_4$ ether polyurethanes are obtainable by polymerization of 1,4-butylene oxide.

In the context of the present invention, a thermoplastic polyurethane of the polyester type and/or a polyester TPU means a thermoplastic polyurethane whose soft segment is formed from polyester polyols, in particular polyester diols.

In the context of the present invention, an ether-ester-type thermoplastic polyurethane and/or an ether-ester TPU is a polyurethane whose soft segment is formed from polyethers and/or oligoethers and polyesters.

In the context of the present invention, a thermoplastic polyurethane of the carbonate type and/or a carbonate TPU is formed by a polyol, in particular a diol, which has a structural element of a carbonic diester.

With regard to the different properties of the various TPUs, aromatic ester TPUs as well as aromatic ether ester TPUs exhibit relative sensitivity to hydrolysis and only moderate weathering properties. However, they have an inherent flame retardant effect as well as good mechanical properties, such as low further cracking resistance and high abrasion resistance.

Aromatic $C_4$-ether TPUs also have moderate weathering properties, but are not sensitive to hydrolysis and have inherent flame retardant properties. Aromatic $C_4$-ether TPUs are commonly found in roofing underlayments.

Aromatic $C_2$- and/or $C_3$-ether TPUs are the lowest cost thermoplastic polyurethanes. They are not sensitive to hydrolysis and have inherent flame-retardant properties. However, the weathering properties are not satisfactory, so that construction films for outdoor applications are generally not formed on the basis of $C_2$- or $C_3$-ether TPUs.

Aromatic carbonate TPUs have an excellent inherent flame-retardant effect and very good weathering stability, and are also highly resistant to hydrolysis and hot storage. However, aromatic carbonate TPUs are cost-intensive to manufacture, which is why they have so far only been used sporadically in special applications.

Finally, aliphatic TPUs have excellent weathering resistance and do not yellow when exposed to light. However, they have no inherent flame-retardant properties, have a high swelling tendency when water is absorbed and are also extremely cost- intensive. Due to these disadvantages, aliphatic TPUs are almost not used in the construction sector.

In the context of the present invention, with regard to the numerous types of different TPUs with the described diverse physical as well as chemical properties, it is particularly advantageous if the aforementioned different TPUs are combined with each other, in particular in a fiber and/or to a fiber component of the first and/or second nonwoven.

Thermoplastic polyurethanes particularly suitable according to the invention can have a hard segment and a soft segment, the soft segment usually being formed by an oligomeric or polymeric polyol and the hard segment consisting of a diisocyanate which has short-chain diols as chain extenders.

In particular, short-chain bifunctional substances, especially diols, whose molecular weight is usually between 18 and 350 g/mol, are used as chain extenders. Preferably, short-chain diols are used as chain extenders. Usually, the chain extenders are dihydric alcohols, in particular selected from the group of 1,2-ethanediol, 1,2-propanediol, 1,4-butanediol, 2,3-butanediol, 1,5-pentanediol, 1,6-hexanediol, 1,8-octanediol, diethylene glycol, triethylene glycol, tetraethylene glycol and higher oligoethylene glycols, dipropylene glycol and higher oligopropylene glycols, dibutylene glycol, higher oligoethylene glycols and mixtures thereof.

In the context of the present invention, an aliphatic or an aromatic polyurethane means a polyurethane whose hard segment contains aliphatic or aromatic diisocyanates and/or is obtained from them by reaction with the chain extenders.

The aromatic diisocyanates are preferably TDI (toluene 2,4-diisocyanate), NDI (naphthylene-1,5-diisocyanate), MDI (methylene di (phenylisocyanate), PDI (polymeric diphenylmethane diisocyanate) or mixtures thereof.

Aliphatic diisocyanates are preferably selected from H12MDI (1-isocyanato-4-[(4-isocyanotocyclohexyl) methyl]cyclohexane), HDI (1,6-hexamethylene diisocyanate), IPDI (3-isocyanate methyl 3,5,5-trimethylcyclohexyl isocyanate), TMXDI (tetramethylxylylene diisocyanate) and CHDI (1,4-cylcohexyl diisocyanate) and mixtures thereof.

In addition, it may also be provided that the fiber component comprises polymers from renewable raw materials, in particular polylactide, for example. To further improve the properties of the fiber, additives can be added to the fiber components and/or, in particular, to the polymers contained therein, especially the thermoplastics. The addition of additives advantageously permits influencing and/or, in particular, optimizing the material properties of the fibers and/or their components used in the nonwoven layers within the scope of the present invention. In this sense, the targeted and directed use of additives makes it possible to have a particularly positive influence on the aging stability of sheets according to the invention.

Suitable additives can be selected from a wide variety of substances and can be used, for example, for coloring, thermostabilization, flame retardancy, hydrophilization or hydrophobization, or UV stabilization of the thermoplastic and/or the fiber as a whole. In this context, it is generally envisaged that the additives are distributed regularly and/or uniformly in the fiber, in particular the polymeric phase of the thermoplastic. In this sense, additives can also be understood as additives which are added to the fiber and/or, in particular, to the polymer and/or plastic contained therein in order to modify and/or improve the properties of the fiber amd/or of the spunbonded nonwoven obtained from the fiber.

In this regard, particularly good results are obtained within the scope of the present invention if the additive is a primary or secondary antioxidant, a UV absorber, a UV stabilizer, a flame retardant, an antistatic agent, a lubricant, a metal deactivator, a hydrophilizing agent, a hydrophobizing agent, an antifogging additive and/or a biocide. The following classes of substances and mixtures thereof are particularly preferred:

-terically hindered phenols, aromatic secondary or tertiary amines, aminophenols, aromatic nitro or nitroso compounds as primary antioxidants.

organic phosphites or phosphonates, thioethers, thioalcohols, thioesters, sulfides and sulfur-containing organic acids, dithiocarbamates, thiodipropionates, aminopyrazoles, metal-containing chelates, mercaptobenzimidazoles as secondary antioxidants.

hydroxybenzophenones, cinnamates, oxalanilides, salicylates, 1,3-benzenediol monobenzoates, benzotriazoles, triazines, benzophenones and UV-absorbing pigments such as titanium dioxide or carbon black as UV absorbers.

metal-containing complexes of organic sulfur or phosphorus compounds, sterically hindered amines (HALS) as UV stabilizers.

metal hydroxides, borates, organic compounds containing bromine or chlorine, organic phosphorus compounds, antimony trioxide, melamine, melamine cyanurate, expandable graphite or other intumescent systems as flame retardants.

quaternary ammonium salts, alkyl sulfonates, alkyl sufates, alkyl phosphates, dithiocarbamates, (earth) alkali metal carboxylates, polyethylene glycols and their esters and ethers, fatty acid esters, ethoxylates, mono-and diglycerides, ethanolamines as antistatic agents.

fatty alcohols, esters of fatty alcohols, fatty acids, fatty acid esters, dicarboxylic acid esters, fatty acid amides, metal salts of fatty acids, polyolefin waxes, natural or artificial kerosenes and their derivatives, fluoropolymers and fluoroligomers, antiblocking agents such as silicas, silicones, silicates, calcium carbonate, etc. as lubricants.

amides of mono-and dicarboxylic acids and their derivatives, cyclic amides, hydrazones and bishydrazones, hydrazides, hydrazines, melamine and its derivatives, benzotriazoles, aminotriazoles, sterically hindered phenols in combination with complexing metal compounds, benzylphosphonates, pyridithiols, thiobisphenol esters as metal deactivators.

polyglycols, ethoxylates, fluoropolymers and fluoroligomers, montan waxes, especially stearates, as hydrophilizing, hydrophobizing or anti-fogging agents.

10,10'-oxybisphenoxarsine (OBPA), N-(trihalomethylthiol) phthalimide, tributyltin oxide, zinc dimethyldithiocarbamate, diphenylantimony-2-ethylhexanoate, copper-8-hydroxyquinoline, isothiazolones, silver and silver salts as biocides.

Turning now further to the nature of the nonwoven layers used in the context of the present invention, it has proved advantageous in accordance with the invention if the first nonwoven layer and/or the second nonwoven layer is formed as a monocomponent fiber nonwoven.

In the context of the present invention, as has already been mentioned, a monocomponent fiber nonwoven is understood to mean a nonwoven that is formed from fibers that essentially have only one fiber component. Preferably, it can also be provided that the fiber component comprises only one polymer, in particular only one thermoplastic, as fiber component, in particular wherein the one polymer and/or the one thermoplastic can likewise, for example, comprise additives and/or be a copolymer.

In a particularly preferred embodiment of the present invention, it may be provided that the monocomponent nonwoven fabric comprises fibers of a component comprising a polymer, in particular a thermoplastic, preferably selected from the group of polyolefins, preferably polypropylene or propylene copolymers, in particular wherein the polymer, in particular the thermoplastic, comprises additives.

Such monocomponent nonwovens have proven to be particularly suitable for the first and/or second nonwoven layer of sheets according to the invention. The nonwovens are characterized by high durability and resistance to environmental influences. In particular, it has been found for preferred nonwovens of this type that they retain both their mechanical strength and resistance as well as their structural integrity over a period of several years and/or decades, even in the presence of constant air movement.

It has been observed and is particularly advantageous that, even in the presence of constant air movement, no increased surface oxidation of nonwoven components appears to take place. Also, a migration of e.g. additive components from the fiber to the nonwoven surface due to constant air movement and consequently an increased supply of oxygen cannot be observed. This particularly high structural integrity and also chemical and mechanical resistance of the monocomponent fiber nonwovens presumably contribute significantly to the overall high aging resistance of these preferred sheets as well as of the sheets according to the invention.

Likewise, in accordance with an alternative preferred embodiment, it may also be appropriate in the context of the present invention for the first nonwoven layer and/or the second nonwoven layer to be formed as a bicomponent fiber nonwoven.

In the context of the present invention, it is thereby preferably provided that the bicomponent fiber nonwoven is formed from bicomponent fibers, in particular wherein the bicomponent fiber typically comprises a first component of a first polymer and a second component of a second polymer. Preferably, the first and/or second component is selected from thermoplastic polymers, in particular of the type described above.

A distinction can now be made between different types of bicomponent fibers, each of which has different characteristic distributions of the components in the fiber cross-section. Bicomponent fibers in which the first component surrounds and thus encloses the second component in the cross-section of the fiber are referred to as core-sheath fibers. Bicomponent fibers in which both the first component and the second component form part of the fiber surface in the cross-section of the fiber are referred to as side-by-side fibers. Fibers with structures in which multiple strands of one component are embedded in a strand of the other component, resulting in an image resembling a plurality of islands formed from one component in cross-section, are referred to as island-in-the-sea fibers. Bicomponent fibers in which a plurality of regions of each component are present in cross-section and form the outer fiber surface are referred to as segmented-pie fibers, since the regions of the individual components regularly have a pie-piece-like division in cross-section.

In the context of the present invention, it is preferred here if the bicomponent fiber is formed as a core-sheath fiber. When the bicomponent fiber is formed as a core-sheath fiber, it is further preferred that the first component forms the core and the second component forms the sheath of the core-sheath fiber.

Preferably, the mass fraction of the first component in the bicomponent fiber is at most 50%, preferably 25%, particularly preferably 10%, most preferably 5%.

To improve the properties of the bicomponent fibers, additives can again be added to the polymers of the first and/or second component, preferably selected from the additives already mentioned above.

The first polymer and the second polymer of the first and/or second component may be formed at least substantially identically, in particular wherein the first component and the second component of the bicomponent fiber then preferably have additives and/or additive compositions and/or additive amounts differing from each other.

Preferably, the first component has an additive, the mass fraction of the additive in the second component being smaller than in the first component. According to the invention, the first component can thus have an additive for influencing and/or improving properties.

Preferably, the mass fraction of the additive of the first component in the second component is at most 66.6%, further preferably at most 50% and in particular at most 33.3%. Quite preferably, the additive is not present in the second component. The advantage of concentrating the additives in the first component, in particular surrounding the second component, is that it has been shown that the amount of additive required in the second component can be lower than in the case of the usual equal distribution of the additive in the two components, if the same or an improved effect of the additive is to be produced.

For example, when performing a fire test according to EN 13501-1, it can be determined that with the distribution of the additive in the components according to the invention, a smaller amount of the additive in total, in this example a flame retardant, is sufficient to lead to a positive test result than with a uniform distribution of the flame retardant in the fiber.

Furthermore, it has been shown that in some cases even particularly advantageous results can be achieved if the additive in the one component is not only reduced but omitted altogether. In any case, one advantage of concentrating the additives in the first component is also the cost saving due to the lower additive quantity required.

Advantageously, the difference between the melting points of the first component and the second component is less than or equal to 8° C. In this context, particularly good results are obtained according to the invention when the difference in the melting points of the first component and the second component is at most 6° C. or between 1° C. to 8° C., preferably between 1° C. to 6° C. In these advantageous parameter ranges, the positive effects of the present invention occur significantly more strongly. It is also possible, for example, to increase both the specific tear strength and the specific nail pull-out force in the case of a nonwoven made from bicomponent fibers according to the invention.

The positive effects of the present invention also include increasing the amount of recycled material that can be added to one of the components in the manufacture of the bicomponent fiber. It has been shown that when components with melting points combined according to the invention are used, the change in the properties of a component caused by the addition of recycled material is much less than with conventional fibers.

Advantageously, the difference between the melt flow indices of the first component and the second component is less than or equal to 25 g/10 min, with the melt flow indices (hereinafter MFIs) of the first component and the second component each being less than or equal to 50 g/10 min.

Preferably, the difference between the melt flow indices of the first component and the second component is less than or equal to 20 g/10 min, particularly preferably 15 g/10 min, and/or the MFIs of the first component and the second component are each less than or equal to 40 g/10 min. Such advantageous selection of the components according to the criterion of their MFIs has, surprisingly, a positive effect in a manner similar to the selection of the components according to the invention on the basis of their melting points.

The MFI is measured according to ISO 1133 with a test load of 2.16 kg and a test temperature of 230° C. The MFI is also referred to as the melt flow index or MFR. The MFI is also referred to as the melt flow index or melt flow rate (MFR). It is determined according to ISO 1133 by melting the material in a heatable cylinder and forcing it through a defined die by means of the test load. The MFI is a measure of the viscosity of the melt of the respective polymer-containing component. The viscosity, in turn, is related to the degree of polymerization, which corresponds to the average number of monomer units in each molecule of a polymer.

The positive influence of the advantageous differences of the MFIs mainly concerns the specific tensile strength and the specific nail pull-out force. These two characteristic values of a spunbonded nonwoven made from the fibers can be improved by the advantageously selected MFIs. It is even possible to increase both characteristic values at the same time, but in any case one of the two characteristic values can be improved without the other characteristic value deteriorating. This also has a positive effect on the haptic properties. Thus, the specific tensile strength can be increased without negatively affecting softness and the so-called "textile handle". The term "textile handle" is understood to mean a touch sensation that is perceived as pleasant.

As has already been mentioned, in the context of a preferred embodiment, the bicomponent fiber is a core-sheath fiber, the mass fraction of the core being 50% to 98%, preferably 60% to 95%, particularly preferably 70% to 95%, most preferably 80% to 90%. It has been shown that the advantages of the bicomponent fiber according to the invention, when this is a core-sheath fiber, occur to a particular extent with these advantageous mass fractions of the core.

Two properties that generally play a special role in nonwovens are the specific tear strength of the nonwoven and the specific nail pull-out force of the nonwoven. Desirably high specific tensile strength is achieved by fibers with high strength. Both a high tear strength and a high specific nail pull-out force have a beneficial effect on the aging stability of sheets as proposed by the present invention.

Advantageously, the specific breaking force of the nonwoven of the first and/or second nonwoven layer in the context of the present invention is thus at least 50 N/5 cm in the machine direction and/or at least 30 N/5 cm in the transverse direction, preferably 55 N/5 cm in the machine direction and/or at least 35 N/5 cm in the transverse direction, preferably at least 55 N/5 cm in the machine direction and/or at least 38 N/5 cm in the transverse direction, particularly preferably at least 57 N/5 cm in the machine direction and/or at least 40 N/5 cm in the transverse direction. The specific tensile strength is measured according to EN 12311-1.

Further advantageously, the specific elongation at break of the nonwoven of the first and/or second nonwoven layer in the context of the present invention is at least 40% in the machine direction and/or at least 45% in the transverse direction, in particular at least 45% in the machine direction and/or at least 50% in the transverse direction, preferably at least 48% in the machine direction and/or at least 53% in the transverse direction, preferably at least 50% in the machine direction and/or at least 55% in the transverse direction, particularly preferably at least 52% in the machine direction and/or at least 57% in the transverse direction.

Furthermore, the specific nail pull-out force of the nonwoven of the first and/or second nonwoven layer is advantageously at least 20 N in machine direction and/or at least 22 N in transverse direction, preferably at least 23 N in machine direction and/or at least 25 N in transverse direction, preferably at least 25 N in machine direction and/or at least 27 N in transverse direction, particularly preferably at least 26 N in machine direction and/or at least 28 N transverse direction.

The specific nail pull-out force is the maximum force that occurs during the tearing of a nonwoven strip when the nonwoven strip already has a given damage, namely a nail pierced through the nonwoven fabric. The specific nail tear-out force is measured according to EN 12310-1. It has been shown that the stated minimum values for the specific nail tear-out force of the nonwoven can be aimed at without the specific tear-out force of the nonwoven dropping disproportionately. In particular, it is also possible to achieve a combination of the above-mentioned specific advantageous nail pull-out forces and the above-mentioned advantageous specific minimum pull-out forces.

In practice, high specific nail pull-out strength often goes hand in hand with good haptics. The softness and textile feel of such nonwovens and the resulting sheets therefore also open up applications, e.g. applications in the hygiene or medical sectors. The reason for the good feel is the high mobility of individual fibers, which is regularly accompanied by the occurrence of high nail pull-out forces. In practice, fibers that behave in this way also regularly exhibit haptic properties that are perceived as soft and pleasant. Fiber segment mobility allows fibers to "collect" in the nail as the nail moves through the nonwoven by avoiding the nail moving through the nonwoven and not tearing immediately. This results in a zone of increased fiber density, i.e. a zone of increased strength, around the nail.

As far as the membrane layer of the flat sheet according to the invention is concerned, this is understood to mean in particular a layer of this kind which exhibits selective permeability. Membranes can be of different types and, in particular, can take the form of films or textiles. Membrane layers, for example, when used as and/or in a sub roofing membrane, ensure that the external influences of the weather do not have a damaging effect on the building interior. The membrane layer can thus also be regarded as a functional layer and/or membrane.

As far as the nature and/or design of the membrane layer is concerned, this can vary depending on the intended use of the flat sheet according to the invention or the corresponding expected conditions of use. However, it is usually preferred in the context of the present invention for the membrane layer to be waterproof and permeable to water vapor.

As previously stated, it is provided in accordance with the invention that the membrane layer is formed as a monolithic membrane layer.

A monolithic membrane layer is understood to mean, in particular, a non-porous layer of a membrane. Monolithic membrane layers can provide particularly good protection against driving rain while at the same time being open to diffusion. Unlike the conventional microporous membrane layer, moisture transport can take place actively along the molecular chains of the materials from which the membrane layer is formed by diffusion.

In order to ensure these advantageous properties as far as possible and/or to set them in the membrane layer, it is provided in the context of the present invention that the membrane layer comprises or consists of a thermoplastic elastomer, in particular selected from the group of thermoplastic polyurethanes and/or thermoplastic copolyesters (TPEE).

Insofar as the thermoplastic elastomer is a thermoplastic polyurethane, it is preferred in the context of the present invention if the thermoplastic elastomer is selected from the group of thermoplastic polyurethanes, in particular from the group of aliphatic and/or aromatic polyurethanes, in particular of the ether type, of the ester type, of the carbonate type and their mixtures or blends thereof, in particular of aliphatic and/or aromatic polyurethanes of the ether type, ester type and mixtures and/or blends thereof, preferably of aliphatic and/or aromatic polyurethanes of the ether type.

Preferably, the membrane layer of sheets according to the invention can contain such thermoplastic polyurethanes as have already been explained in connection with the fiber components of the first and/or second spunbonded layer. In this sense, reference is made at this point to the above explanations on thermoplastic polyurethanes suitable and/or, in particular, preferred according to the invention.

In the context of the present invention, it is particularly preferred if the membrane layer comprises a thermoplastic elastomer selected from the group of thermoplastic polyurethanes from the group of aliphatic and/or aromatic polyurethanes, of the ether type.

In particular, thermoplastic polyurethanes from the group of aliphatic and/or aromatic polyurethanes of the ether type are characterized by a comparatively high hydrolysis resistance and resistance to environmentally induced weathering. This has a particularly advantageous effect on the aging resistance of the sheet according to the invention and, particularly in conjunction with the properties of the first and/or second nonwoven layer, makes a positive contribution to the outstanding durability and resistance of the sheet according to the invention.

In a further preferred embodiment of the sheet according to the invention, it is also provided that the material of the functional layer, in particular the thermoplastic polyurethane, has a proportion of at least 10%, preferably from 15% to 100%, further preferably from 20% to 70%, of material originating from renewable raw materials. Renewable raw materials are in particular organic raw materials that originate from agricultural and forestry production and are used specifically for further application purposes outside the food and feed sector.

It can also have a beneficial effect on the properties of the membrane layer if the membrane, in particular the thermoplastic polymer contained in the membrane, contains additives, in particular as previously mentioned in connection with the fibers contained in the first and/or second nonwoven layer and/or their components. Just as in the case of the fibers of the nonwoven layers, the membrane layer can also be stabilized by the addition of selected additives, in particular with respect to external environmental influences, and thus be made more resistant to aging.

Particularly good results, i.e. in particular highly aging-stable as well as long-term functional, sheets are obtained in the context of the present invention if the membrane layer has a grammage and/or weight per unit area in the range from 10 to 150 $g/m^2$, in particular from 15 to 100 $g/m^2$, preferably 18 to 80 $g/m^2$, preferably 20 to 50 $g/m^2$.

In an alternative preferred embodiment of the present invention, it has also proved useful if the membrane layer has a grammage and/or weight per unit area of less than 100 g/m². In particular, the grammage may be between 1 to 70 g/m², more preferably between 3 to 40 g/m², particularly preferably between 4 to 30 g/m² and especially between 5 to 25 g/m².

With regard to the further embodiment of the membrane layer, it can also be provided that the membrane layer has at least two layers of membrane layers. These membrane layer layers can be formed differently, or the at least two membrane layer layers can be formed at least substantially identically. In this way, the functional spectrum and/or the range of functionality of the sheet according to the invention can be expanded in an efficient and overall advantageous manner and, at the same time, the resistance and/or durability of the sheet according to the invention can also be optimized. In addition to a two-layer structure, a three-or even four-layer membrane structure is also conceivable, in particular and depending on the application and/or conditions.

In particular, in the case of a three-layer structure of the membrane layer, the outer membrane layers enclosing a central membrane layer can be designed to be at least essentially identical, in particular with a design that is preferably stable to aging and/or weathering being selected for the outer membrane layers.

An identical design means in particular that the membrane layers have the same surface properties and/or the same material and/or the same material composition. Ultimately, the identical membrane layers can also have the same function. For example, the weights per unit area of the identically formed membrane layers may differ by less than 5 g/m².

Furthermore, it may be provided in the context of the present invention that the sheet comprises a plurality of membrane layers. If the sheet according to the invention comprises a plurality of membrane layers, it may be advantageous if the plurality of membrane layers are arranged directly on top of each other. Likewise, it is also possible that the plurality of membrane layers are arranged separately from one another, in particular wherein the membrane layers are separated by a further nonwoven layer and/or a fabric layer. Furthermore, it is also possible that the multiple membrane layers each also have multiple membrane sheet layers.

In a very particularly preferred embodiment of the present invention, it may be provided that at least one membrane sheet layer of the membrane layer, in particular an outer membrane sheet layer preferably facing the first and/or the second nonwoven layer, comprises as material thermoplastic copolyester (TPEE) and/or thermoplastic polyurethane (TPU) and/or consists thereof.

Furthermore, in a preferred embodiment of the invention, the membrane layer can be formed from TPEE layers and/or TPU layers and/or from TPEE layers as well as TPU layers. In particular, the TPEE layers and/or the TPU layers and/or the membrane sheet layers of the membrane layer are firmly bonded to one another, in particular inseparably.

TPEE layers have a good and/or high tear propagation resistance with simultaneous high strength and stiffness while ensuring resistance to liquids. A monolithic TPEE membrane is particularly well extrudable and also suitable for thin membranes. In particular, a membrane layer comprising TPEE is suitable for a co-extruded sheet, especially one comprising several layers, and makes sense from a technical point of view.

TPU is also intrinsically flame retardant, in particular, and exhibits good long-term aging behavior, preferably for service lives of more than 10 years.

In another preferred embodiment of the present invention, it is provided that at least one outer membrane sheet layer and/or an inner membrane sheet layer of the multilayer membrane layer comprises and/or consists of a foamed polymer.

During the extrusion lamination process, the outer foamed layer of the membrane layer can achieve an interlocking with the nonwoven layers—that is, the first and/or the second nonwoven layer—which improves the composite adhesion with the nonwoven layers, which in turn has a particularly advantageous effect on the aging stability of the sheet according to the invention.

Preferably, therefore, the outer membrane sheet layer of the membrane layer comprising the foamed polymer is bonded to the first and/or the second nonwoven layer, at least also by interlocking.

The interlocking can be caused by slower cooling due to the foamed polymer layer. Kneading eddies in the press shop—which are caused during production, especially during calendaring, of the flat sheet—can also contribute to calendaring. In particular, the foamed polymer layer penetrates into open pores on the outside of the nonwoven layer facing the foamed polymer layer, allowing a strong bond to the nonwoven layers.

An inner membrane layer comprising a foamed polymer may further be provided to ensure reliable nail tightness.

Preferably, the membrane layers may further have the same or a different proportion of additives, in particular with respect to the relative additive amount and/or the type and/or material of the additive(s).

In particular, for example in the case of a three-layer membrane structure, at least two membrane sheet layers, preferably the outer membrane sheet layers, can have at least essentially the same and/or identical material, preferably TPU, with a different additive addition. The additive addition can be shown and/or reflected in a different amount or mass of the additive—relative to the volume and/or the area of the membrane sheet layer and/or the total amount—and/or in a different additive composition. With regard to the selection of additives, reference can be made to the preferred additives already mentioned above.

In addition, it has proven advantageous if the membrane layer has a layer thickness in the range of 0.01 mm to 2.5 cm, in particular 0.05 mm to 1.5 cm, preferably 0.1 mm to 1 cm.

Depending on the application of the flat sheet according to the invention, it is therefore possible, in particular in combination with the corresponding formation of the first and/or second nonwoven layer, to provide a highly aging-resistant and correspondingly long-term functional sheet with a membrane layer that is thinner or thicker as required, in particular wherein the durability of the membrane layer is again based on a synergistic combination effect of material selection and composition as well as correspondingly adjusted membrane layer thickness. In any case, membrane layers with the above-mentioned preferred thicknesses in particular have proved particularly useful in the context of the present invention.

In the context of a further preferred embodiment of the flat sheet according to the invention, it may also be provided that the membrane layer is firmly bonded, in particular glued, to the first nonwoven layer and/or the second nonwoven layer.

Consequently, an adhesive layer and/or adhesion promoter layer may be provided between the membrane layer and at least one of the nonwoven layers. The bonding of the layers can take place during manufacture, in particular during the extrusion laminating process. Preferably, the adhesion promoter layer and/or adhesive layer can be used to achieve a material bond between the layers to be joined.

The adhesive and/or bonding promoter layer can be arranged in particular on the first nonwoven layer, the second nonwoven layer and/or the membrane layer. Preferably, an adhesive layer and/or adhesion promoter layer is provided between the membrane layer and the first and/or the second nonwoven layer, in particular over the entire surface, preferably for a firm and adhesive bond. It has also proved useful if the adhesive layer and/or adhesion promoter layer is provided between the membrane layer and the first and/or the second nonwoven layer over part of the surface, in particular wherein the adhesive or adhesion promoter is preferably applied in a dot-shaped, grid- shaped, diamond-shaped and/or torn-open manner. The adhesive and/or adhesion promoter is preferably applied by means of nozzles or rollers.

The adhesive and/or adhesion promoter layer may further comprise a polymer, in particular an adhesion promoter polymer. The adhesion promoter polymer may thereby preferably be a plastic and/or a synthetic resin, and preferably comprise a polyurethane. The adhesion promoter layer is preferably firmly bonded to the membrane layer, the first nonwoven layer and/or the second nonwoven layer.

Particularly good results are achieved in this context if the adhesive and/or adhesion promoter layer is formed by a reactive polyurethane hot melt adhesive. The reactive polyurethane hot melt adhesives used preferably have polyester and/or polyether segments. Particularly good results are obtained here if the proportion of polyether segments predominates over the polyester segments. Preferably, the polyurethane hot melt adhesive has only polyether segments.

Within the scope of the present invention, it is usually provided that the adhesive and/or adhesion promoter layer is applied with a weight per unit area of 2 to 20 g/m$^2$, in particular 4 to 15 g/m$^2$, preferably 5 to 10 g/m$^2$. The adhesive layer and/or adhesion promoter layer can be applied both to the membrane layer and to the nonwoven layer.

Furthermore, the adhesive and/or adhesion promoter layer can also be integrated into the first nonwoven layer, into the second nonwoven layer and/or into the membrane layer in such a way that the adhesion promoter polymer is enclosed and/or arranged in the surface area, in particular on the outside, of the aforementioned layers. Thus, the adhesion promoter layer can be formed as part or component of the membrane layer and/or the first nonwoven layer and/or the second nonwoven layer.

The adhesion promoter layer enables a firm bond between the membrane layer and the nonwoven layers on the outside. The adhesion promoter and/or adhesion promoter polymer enables the non-woven layers to be permanently bonded to the membrane layer.

By incorporating functional materials, for example adhesion promoter polymers and/or flame retardants, into the first and/or second nonwoven layer, a cost-effective structure of the flat sheet can be achieved.

By using the adhesion promoter and/or the adhesion promoter polymer and/or the adhesion promoter layer in the outer layer of the first and/or the second nonwoven layer, the use of hotmelts can be dispensed with (hotmelt-free bonding). Thus, the adhesion promoter and/or the adhesive can already ensure sufficient bonding and/or adhesion to the membrane layer.

However, it may also be advisable to use hot melts in the adhesive and/or adhesion promoter layer, in particular reactive hot melts being preferred. The use of hotmelts as adhesion promoters and/or adhesives can have a positive influence on, or in particular further increase, the aging resistance and the cold and snow resistance of the films.

Furthermore, in another preferred embodiment of the present invention, it may be provided that the flat sheet comprises, in addition to optionally further membrane layers and/or further nonwoven layers, at least one reinforcing layer.

In particular, it may be provided that the at least one reinforcing layer is arranged between the membrane layer and the first and/or the second nonwoven layer. In particular, a reinforcing layer may be arranged between the first nonwoven layer and the membrane layer and between the second nonwoven layer and the membrane layer, respectively. The reinforcing layer can be in the form of a leno fabric and serves, in particular, to increase the mechanical stability of the flat sheet. Thus, the reinforcing layer likewise influences the durability and aging stability of the sheet according to the invention in an advantageous manner. Furthermore, cross-laminate fabrics can also be used as a preferred reinforcing layer, particularly preferably polypropylene cross-laminate fabrics.

Preferably, the reinforcing layer comprises and/or consists of a plastic and/or a synthetic resin, preferably a plastic polymer, in particular polypropylene and/or polyethylene and/or polyethylene terephthalate (PET).

Leno fabrics are transparent and/or air-permeable fabrics characterized by special warp threads. The warp threads form the so-called leno units, in which a ground thread and a looping thread from the warp twist together. In this process, the inclusion of the weft and the twisting of the two warp threads alternate with each other. In the case of a so-called full twist, a complete twist of the warp threads is caused between the weft threads; in the case of a half twist, a simple interlacing occurs. In particular, the fabric has a low weight per unit area. By tightly enclosing the weft threads from the two warp threads, a sliding strength can be ensured.

With regard to the further properties of the sheet provided in accordance with the invention beyond the high aging stability of the sheet provided in accordance with the invention, it is initially particularly preferred if the sheet is permeable to water vapor, open to diffusion, windproof, rainproof and/or water-repellent and/or waterproof, in particular wherein the sheet has an $S_d$ value of less than or equal to 0.5 m, in particular from 0.008 m to 0.5 m, preferably from 0.009 m to 0.2 m, preferably from 0.01 m to 0.1 m.

The $S_d$ value indicates the water vapor diffusion equivalent air layer thickness and is a building physics measure of the water vapor diffusion resistance of a component or a component layer. The vapor permeability of a building material can be assessed via the $S_d$ value. The water vapor diffusion resistance is graphically described by the thickness of a layer of air that is necessary so that the same diffusion current—as the component under consideration—flows through the air layer in a stationary state under the same conditions. In particular, the flat sheet is designed to be open to diffusion, with diffusion openness being characterized by an $S_d$ value of less than or equal to 0.5 m.

The rain proofness and/or water vapor permeability of the sheet can be ensured in particular by the diffusion-open nature of the membrane layer. The membrane layer is thus preferably designed in such a way that the flat sheet as a whole is permeable to water vapor and/or open to diffusion and/or waterproof, in particular permeable to water vapor and waterproof.

In this context, sheets according to the invention advantageously have a weight per unit area of 100 to 400 g/m², in particular 120 to 300 g/m², preferably 140 to 200 g/m².

Furthermore, with regard to the mechanical properties of sheets according to the invention, it is preferably provided that the specific breaking load of the sheet is at least 190 N/5 cm in machine direction and/or at least 135 N/5 cm in transverse direction, preferably 195 N/5 cm in machine direction and/or at least 140 N/5 cm in transverse direction, preferably at least 198 N/5 cm in machine direction and/or at least 143 N/5 cm in transverse direction, particularly preferably at least 200 N/5 cm in machine direction and/or at least 145 N/5 cm in transverse direction. The specific tensile strength is measured according to EN 12311-1.

Further advantageously, the specific elongation at break of the sheet is at least 25% in the machine direction and/or at least 50% in the transverse direction, in particular at least 30% in the machine direction and/or at least 55% in the transverse direction, preferably at least 33% in the machine direction and/or at least 58% in the transverse direction, preferably at least 35% in the machine direction and/or at least 60% in the transverse direction.

In addition, the tensile strength of the flat sheet can be greater than 50 N/mm. Preferably, the tear strength of the sheet is between 50 N/mm to 600 N/mm, more preferably between 100 N/mm to 400 N/mm. The tear strength of the sheet may correspond to the force required until crack formation and/or crack expansion. In particular, the tear strength is measured according to ASTM International technical standard; namely ASTM D1004 (as of September 2018) and ASTM D1925 (as of September 2018).

Preferably, the tear propagation strength of the flat sheet is greater than 50 N/mm. Preferably, the tear strength is between 50 N/mm and 500 N/mm, more preferably between 100 N/mm and 300 N/mm. The tear propagation strength is a physical parameter that characterizes a material property as well as the application range of the sheet. Tear strength can also be referred to as notch strength. The tear propagation strength indicates the resistance of a material—in this case the flat sheet—not to tear further after being cut or scored. The higher the determined value of the tear resistance, the more resistant the tested material is to further tearing. In contrast, the lower the value, the lower the tear resistance of the material. Consequently, the tear propagation strength follows metrologically the measurement of the tear strength.

Both the tear strength and the tear propagation strength can be designed to be direction-dependent, in particular as a function of the fiber direction (machine direction and transverse direction). The above-mentioned tear strengths apply in particular to the machine direction and/or transverse direction.

The machine direction is the direction in which the nonwoven was transported in or through the machine during production, i.e. regularly the length direction of a nonwoven sheet. The transverse direction in which the sheet expands over its surface is the direction at right angles to the machine direction, i.e. regularly the direction in the width of a sheet.

Further subject matter of the present invention—according to a second aspect of the present invention—is the use of a highly aging-resistant flat sheet, as described above, in the construction sector, in particular as a sarking sheet, underlayment sheet and/or sheathing sheet in a roof structure and/or facade sheet in a wall structure.

For further details on this aspect of the invention, reference can be made to the above explanations on highly aging-resistant flat sheets according to the invention, which apply mutatis mutandis with respect to the use according to the invention.

In addition, a subject matter of the present invention—according to a third aspect of the present invention—is a method for producing a highly aging-resistant flat sheet for the construction sector as described above, comprising a multilayer structure comprising at least a first nonwoven layer and a second nonwoven layer and at least one membrane layer arranged between the nonwoven layers, and wherein the sheet has an aging stability of at least 15 years, wherein the at least one membrane layer is extruded between the at least first and second nonwoven layers, and the membrane and nonwoven layers are laminated immediately thereafter.

A particular advantage of the process according to the invention is that the direct sequence of extrusion of the membrane layer between the nonwoven layers and lamination of the layers to one another makes it possible to achieve a particularly intimate bond between the layers, which is particularly advantageous for the high aging stability of sheets according to the invention.

Likewise, on the basis of the process control according to the invention, it is possible in an advantageous manner to produce in a particularly time-and cost-efficient manner by combining process steps, which are usually carried out in several process steps and/or locally separated, i.e. on different devices, into one step.

In this sense, it is thus preferably provided in the context of the present invention that all steps in the context of the production of the sheets are carried out as concertedly as possible and/or, in particular, at least immediately one after the other.

According to the invention, it is preferred if the membrane layer, in particular in the form of a monolithic membrane, preferably comprising thermoplastic polyurethane, is extruded directly onto the nonwoven layers and/or between the nonwoven layers. It has also proved advantageous if an adhesive layer and/or adhesion promoter layer is provided between the nonwoven layers and the membrane layer. The adhesive layer and/or adhesion promoter layer can be applied over the entire surface or part of the surface.

If the sheet according to the invention has an adhesive layer and/or adhesion promoter layer, it is preferably provided according to the invention that the adhesive layer and/or adhesion promoter layer is applied by means of nozzles and/or rollers. The use of a nozzle and/or roller arrangement permits in particular a regular and uniform application of the adhesive and/or adhesion promoter.

Particularly if a partial-surface application of the adhesive and/or adhesion promoter is desired, it has proven effective if the adhesive or adhesion promoter is applied in a dot-shaped, grid-shaped, diamond-shaped and/or torn manner. For partial- surface application of the adhesive and/or adhesion promoter, in particular in accordance with the above-mentioned application patterns, wide-slit nozzles and/or engraved coating rollers have proved to be particularly suitable.

In general, it is possible for the adhesive layer and/or adhesion promoter layer to be applied to the nonwoven layer and/or the membrane layer. According to the invention, it has proved useful in this respect if the adhesive layer and/or adhesion promoter layer is applied to the nonwoven layer and/or layers, in particular wherein the extrusion of the membrane layer then takes place on and/or between the adhesive layer(s) and/or adhesion promoter layer(s) applied to the nonwoven layer(s).

By applying the adhesive layer and/or adhesion promoter layer preferably immediately before the extrusion of the membrane layer onto the adhesive layer and/or adhesion promoter layer, an optimum adhesive and/or bonding effect can be achieved between the layers, in particular since the lamination of the layers follows as directly as possible. As a result, sheets according to the invention are ultimately characterized in particular by a particularly high bond adhesion. This also contributes to the high stability of sheets according to the invention with respect to weathering, hydrolysis and, in general, aging phenomena.

Furthermore, it is also possible to integrate a reinforcing layer, which can also be introduced into the sheet as part of the process according to the invention.

For further details on the manufacturing process according to the invention, reference may be made to the above explanations on the other aspects of the present invention, which apply accordingly with respect to the process according to the invention.

Furthermore, a subject matter of the present invention—according to a fourth aspect of the present invention—is a method for determining the aging stability of flat sheets for the construction sector, in particular according to the present invention, wherein (a) in a first step, the sheet is subjected to an artificial aging process, wherein the sheet is subjected to a temperature of 70±2° C. and an air velocity of 5±2 m/s, and (b) in a subsequent second step, the watertightness of the sheet is tested in accordance with DIN EN 13859-1-2010-11, section 5.2.3, against a water column of at least 200 mm over a period of 2 h.

With the method according to the invention, the present invention provides in particular an improved long-term aging simulation after covering for sheets in addition to the existing standards and test methods for the construction sector, with which a reliable statement about the aging stability of the sheet can be made in an advantageous manner, in particular one that is more accurate for the real application. Such a statement, in particular one that is accurate and precise, is not necessarily possible with the normative test methods currently provided or available. In particular, cases in which sheets that are supposedly stable to aging according to the normative test procedure fail prematurely and/or are overaged surprisingly quickly impressively show that the current test methods and aging simulations can only insufficiently predict and/or confirm the actual aging stability of the sheets in question.

The applicant has now established in a surprising way that the influencing factor "air movement" in particular, and here in particular the speed at which the air moves, has a significant and/or far-reaching influence on the aging stability of a corresponding sheet. However, the aspect of air movement is not adequately addressed and/or considered in previous standards. Nevertheless, the sheets in question are more or less permanently exposed to air movements in the application.

Within the scope of the method according to the invention, this aspect is now taken into account, so that with the method according to the invention a basically more realistic simulation of the aging phenomena of a sheet is provided. Here, the artificial aging process according to step (a) of the method according to the invention, in addition to the possibility of making a more realistic statement about the aging stability of a sheet, also makes it possible, in particular, to obtain this statement within an acceptable period of time and/or an acceptable duration of the method. This means that within the scope of the method according to the invention, it is advantageously possible to achieve an accelerated aging of sheets and, at the same time, to achieve aging results which correspond at least substantially to the aging pattern of a corresponding sheet under real conditions, i.e. within the scope of the corresponding application.

Against this background, it has proved advantageous in the context of the present invention with regard to carrying out the process according to the invention if, in the first step (a), the artificial aging process for determining the aging stability is carried out over a period of at least 30 weeks, in particular at least 36 weeks, preferably at least 40 weeks, preferably at least 48 weeks, particularly preferably at least 64 weeks.

In this context, it has been found in particular that the sheet ages in the artificial aging process by 4 to 5 months, in particular by 4.5 months, in one week. Likewise, according to the invention, it can also be assumed that the sheet ages by one year in the artificial aging process in 2 to 3 weeks, in particular in 2.5 weeks.

In this sense, therefore, there is in particular at least essentially a, preferably linear, correlation between the desired and/or predetermined aging stability of a sheet and the duration over which the artificial aging process can be carried out in the first step (a) of the method according to the invention. Accordingly, it has proven advantageous for the present invention if the duration of the execution of the aging process in weeks is and/or is determined as a function of the desired aging stability of the sheet in years.

This means, for example, for a sheet which is to have a targeted and/or specified aging stability of at least 15 years, that—in accordance with the aforementioned correlation between carrying out the artificial aging process and aging of the sheet in years—the artificial aging process would have to be carried out in particular over a period of at least 30 weeks, in particular at least 36 weeks, preferably at least 48 weeks. Following this, it can then be verified in the course of process step (b) that the sheet in question is watertight under the conditions mentioned, which represents in particular a confirmation of the correspondingly targeted and/or specified aging stability.

Likewise, for sheets which are to exhibit a higher aging stability, for example of at least 20 or at least 25 years, it may be expedient if the duration of the execution of the first process step (a), i.e. the artificial aging process, is adapted or, in particular, extended, preferably taking into account the said correlation between the duration of the execution of the artificial aging process in weeks and the desired aging stability of the corresponding sheet in years. Based on this correlation, it follows, for example, for sheets which are to have aging stabilities of at least 20 or in particular at least 25 years, that the corresponding process step (a) would have to be carried out over a duration of in particular at least 40 or in particular at least 50 weeks, preferably at least 48 or in particular at least 60 weeks.

In this sense, the method according to the invention represents a particularly flexible and, depending on the requirements or the sheet to be examined, adaptable possibility of checking and confirming a desired and/or specified aging stability of a sheet.

A particular advantage of the process according to the invention is in particular that the aging simulation, which is carried out in process step (a), is much closer to reality with regard to the determination of the actual aging resistance and the related test result, which is obtained in particular in process step (b), than is the case for currently available processes.

On the basis of the method according to the invention, it is thus possible to obtain more reliable and also more precise information about the aging resistance and/or durability of an examined sheet within the framework of a method that is in particular both inexpensive and comparatively time efficient For carrying out the process according to the invention, it has also proved useful if step (a) is carried out in an oven, in particular an oven with a design based on the EN 1296-2001-03 standard. In this way, it can be advantageously ensured that constant conditions act on the sheet to be investigated over the duration of the artificial aging process and that, accordingly, in particular reproducible results are obtained on the durability and/or aging stability of the sheet investigated in each case.

In this context, it is particularly important that the furnace in which the artificial aging process is carried out is designed for the temperatures and air velocities for artificial aging provided for in the invention. Accordingly, the oven can also deviate from the above standard in this respect and, for example, be designed in particular for the generation of higher air velocities.

Furthermore, it has proven advantageous if in step (a) the air in the furnace is exchanged regularly, in particular at least 5 times per hour, preferably 7 times per hour, preferably 10 times per hour.

In this way, for example, an accumulation of possibly volatile material components expelled from the sheet can be avoided in the furnace atmosphere. Likewise, the oxygen content and correspondingly the oxidation potential can be kept constant under the artificial aging conditions, so that overall it is advantageously ensured that, within the scope of the present invention, reliable results and outcomes are obtained with respect to the aging resistance of films according to the invention.

In addition, it has proven useful if the sheet is introduced into the furnace clamped in a frame in step (a).

In this respect, it has further proved advantageous if the sheet to be examined is clamped in the frame in the form of test sections, in particular wherein the test sections have a size of at least 15 cm×15 cm.

If, within the scope of the method according to the invention, a frame is used for inserting test sections of the sheet to be examined, it can be ensured in this way in particular that, for example, corners and edges of the sheet or of the test sections do not curl and/or move under the action of temperature and/or air, so that it is ensured in particular that all areas of the test section of the sheet to be examined are uniformly exposed to the artificial aging conditions.

In this respect, it is further preferred that the sheet is introduced into the oven in such a way that only the side facing the weather in the application of the sheet is exposed to the artificial aging conditions.

For this purpose, it has proven useful if the side facing away from the weather in the case of use of the sheet is covered, in particular, for example, with a metal foil or another test section, so that in the case of use, sides of the two test sections facing away from the weather are arranged facing each other and the sides of the two test sections facing the weather in the case of use are facing away from each other and, in particular, are exposed to the artificial aging conditions.

As far as checking the watertightness of the sheet according to the invention, in particular after prior artificial aging, in process step (b) is concerned, it has proved useful here if the watertightness is checked—in addition to the standard DIN EN 13859-1-2010-11—in conjunction with the standard DIN EN ISO 811-2018-08, in particular wherein the watertightness is checked without a cover plate and/or cover sheet and limited to an area of 100 cm$^2$ of the flat sheet.

In order to avoid unnecessary repetition, reference may furthermore be made to the above explanations concerning the other aspects of the invention, which apply mutatis mutandis with respect to the use according to the invention.

The subject matter of the present invention will be further explained below on the basis of preferred embodiments by means of the figure illustration and by means of embodiment examples in a non-limiting manner.

FIG. 1 shows a schematic cross-sectional view of a highly aging-stable flat sheet 1 according to the invention, comprising a first nonwoven layer 3 and a second nonwoven layer 4, with a membrane layer 2 arranged in between. The sheet 1 has an aging stability of at least 15 years. The aging stability of the sheet 1 is determined and/or confirmed by subjecting the sheet to an artificial aging process. This artificial aging process is performed at a temperature of 70±2° C. and an air velocity of 5±2 m/s. Following the artificial aging process, the watertightness of sheet 1 is tested in accordance with DIN EN 13859-1-2010-11, section 5.2.3, against a water column of at least 200 mm over a period of 2 h. The test is performed at a temperature of 70±2° C. and an air velocity of 5±2 m/s.

Based on this approach, an efficient as well as reliable simulation of the aging behavior of sheet 1 can be achieved, on the basis of which it is safely confirmed that sheet 1 reliably and demonstrably exhibits the targeted aging stability of at least 15 years in the application.

Preferably, the aging stability of the sheet 1 can also be even higher and in particular be at least 20 years, preferably at least 25 years. Finally, particularly preferred embodiments of the sheet 1 according to the invention have an aging stability in a range of 15 to 75 years, in particular 20 to 60 years, preferably 25 to 50 years.

The artificial aging process for determining or confirming the aforementioned desired aging stabilities can be carried out in this respect over a period of at least 30 weeks. In this context, it has been found in particular in the context of the present invention that the sheet 1 ages in the artificial aging process, i.e. in particular under the aforementioned process conditions, by 4 to 5 months, in particular by 4.5 months, in one week. Alternatively, it can also be assumed that the sheet ages by one year in the artificial aging process in 2 to 3 weeks, in particular in 2.5 weeks.

Accordingly, the duration in weeks for carrying out the aging process is preferably determined as a function of the desired aging stability of the sheet in years, and/or the duration over which the sheet 1 is exposed to the artificial aging conditions is preferably determined as a function of the desired aging stability in accordance with the aforementioned correlations.

In this sense, it has proven to be appropriate for sheets 1 which have a higher aging stability of at least 20 years and/or, in particular, at least 25 years, if such sheets 1 are exposed to artificial aging conditions, i.c. a temperature of 70±2° C. and an air velocity of 5±2 m/s, for a period of at least 40 and/or, in particular, at least 50 weeks, preferably at least 48 and/or, in particular, at least 60 weeks, before the watertightness of the sheets 1 is subsequently tested and/or confirmed.

With reference to the application in the building sector, i.e. for example in particular as a sarking sheet, underlayment sheet and/or sheathing sheet in a roof structure and/or facade sheet in a wall structure, the upper side 14 of the membrane can be formed by the first nonwoven layer 3 and the lower side 13 by the second nonwoven layer 4. As far as the nature of the first nonwoven layer 3 and/or the second nonwoven layer 4 is concerned, it has proved to be advantageous in accordance with the present invention if the first nonwoven layer 3 and/or the second nonwoven layer 4 are arranged on the outside. That is, it is preferred in the context of the present invention if at least one of the nonwoven layers 3 or 4, in particular both nonwoven layers 3 and 4, form the outer surfaces of the sheet 1.

Furthermore, good results are obtained within the scope of the present invention if the first nonwoven layer 3 and/or the second nonwoven layer 4 is formed as a spunbonded nonwoven and/or as a needled nonwoven. The first nonwoven layer 3 and/or the second nonwoven layer 4 can in particular be formed both identically to one another and differently from one another, in particular for example with regard to the grammage and/or the weight per unit area, the material composition and/or the formation of nonwoven and/or fiber in the nonwoven. An identical design of the nonwoven layers 3 and 4 means that the nonwoven layers and/or the nonwovens they comprise have the same surface properties, the same material and/or the same material composition and/or the same grammage.

The nonwoven layers and/or comprised nonwovens used in the context of the present invention are advantageously suitable for sheets 1 according to the invention if the weight per unit area and/or grammage of the first and/or second nonwoven layer 3 or 4 is between 10 g/m$^2$ and 150 g/m$^2$, preferably 20 g/m$^2$ to 120 g/m$^2$, preferably 30 g/m$^2$ and 100 g/m$^2$.

The first nonwoven layer 3 and/or second nonwoven layer 4 are usually formed from fibers, in particular continuous fibers, for example, if the first and/or second nonwoven layer 3 and/or 4 is in the form of a spunbonded fabric.

With regard to the properties of the fibers, it has proven useful if the diameter of the fiber is between 1 μm and 50 μm, preferably between 5 μm and 30 μm, particularly preferably between 8 μm and 20 μm. In addition to the fiber thickness, the properties of the fiber and thus of the resulting nonwoven are also influenced in particular by the choice of material and/or the properties of the components from which the fiber is formed.

The fibers may have one or more components, in particular good results being obtained if the one fiber component and/or the multiple fiber components are selected from thermoplastics, in particular from the group of polyolefins, polyesters, polyamides and/or thermoplastic polyurethanes, preferably from the group of polyolefins, polyesters and/or thermoplastic polyurethanes.

In the case where the thermoplastic is selected from the group of polyolefins, it has proved particularly useful if the polyolefin is selected from the group of polyolefin homopolymers, in particular polyethylene, polypropylene, polybutylene, polyhexylene, preferably polyethylene, polypropylene, the group of polyolefin copolymers, in particular ethylene copolymers, propylene copolymers, butylene copolymers, hexylene copolymers. It is particularly preferred in the context of the present invention if the polyolefin is selected from polyethylene, polypropylene, ethylene copolymers, propylene copolymers, and mixtures and/or blends thereof.

It has also proved advantageous if the thermoplastic is selected from the group of polyesters comprising polyethylene terephthalate, polybutylene terephthalate, polytrimethylene terephthalate, polyethylene furanoate, copolymers thereof and mixtures and/or blends thereof, in particular polyethylene terephthalate, polybutylene terephthalate, polyethylene furanoate, copolymers thereof and mixtures and/or blends thereof, preferably polyethylene terephthalate, polyethylene furanoate, copolymers thereof and mixtures and/or blends thereof.

Last but not least, good results are obtained in the context of the present invention if the thermoplastic is selected from the group of thermoplastic polyurethanes comprising aliphatic and/or aromatic polyurethanes, in particular of the ether type, ester type, carbonate type and mixtures and/or blends thereof, in particular aliphatic and/or aromatic polyurethanes of the ether type, ester type and mixtures and/or blends thereof, preferably aliphatic and/or aromatic polyurethanes of the ether type.

In addition, it can be advantageous if the fiber component comprises polymers made from renewable raw materials, in particular polylactide, for example.

To further improve the properties of the fiber and thus the properties of the first and/or second nonwoven layer 3 and/or 4, additives can be added to the fiber components and/or, in particular, to the thermoplastics. These additives can be selected from a wide variety of substances and can serve, for example, for coloring, for thermostabilization, for flame retardation, for hydrophilization or hydrophobization, or for UV stabilization of the thermoplastic and/or the fiber as a whole.

In this context, it is generally intended that the additives are distributed regularly and/or uniformly in the fiber, in particular the polymeric phase of the thermoplastic. In this sense, additives can also be understood as additives which are added to the fiber and/or, in particular, to the plastic in order to modify and/or improve the properties of the fiber and/or of the spunbonded nonwoven obtained from the fiber. In this context, it has proven advantageous if the additive is a primary or secondary antioxidant, a UV absorber, a UV stabilizer, a flame retardant, an antistatic agent, a lubricant, a metal deactivator, a hydrophilizing agent, a hydrophobizing agent, an antifogging additive and/or a biocide.

Figures 8, 9:
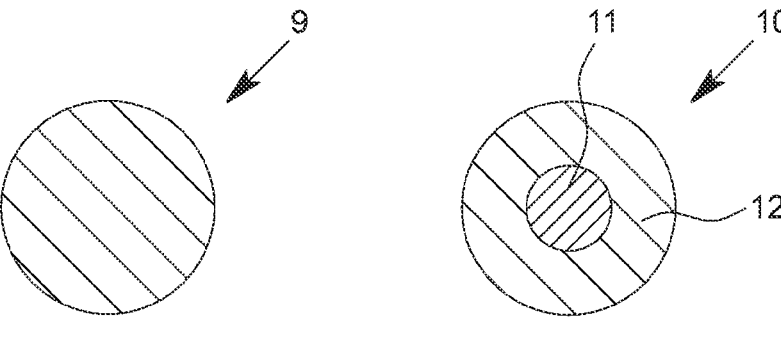
FIG. 8 a schematic cross-sectional view of a monocomponent fiber preferably used in the present invention.
FIG. 9 a schematic cross-sectional view of a bicomponent fiber preferably used in the present invention.

With regard to the nature of the first nonwoven layer 3 and/or the second nonwoven layer 4, it is generally preferred for sheets 1 according to the invention if the first nonwoven layer 3 and/or the second nonwoven layer 4 is formed as a monocomponent fiber nonwoven. This embodiment of the sheet 1 according to the invention is quite particularly preferred in the context of the present. Monocomponent fibers 9, as shown schematically in FIG. 8, permit a cost-effective and also reliably resilient and durable structure of the sheet 1.

In a particularly preferred embodiment of the present invention, it may be provided that the monocomponent nonwoven fabric comprises fibers of a component comprising a polymer, in particular a thermoplastic, preferably selected from the group of polyolefins, preferably polypropylene or propylene copolymers, in particular wherein the polymer, in particular the thermoplastic, comprises additives.

Monocomponent fiber nonwovens of this type have proved to be particularly suitable for the first and/or second nonwoven layers 3 and 4 of sheets 1 according to the invention. The nonwovens are characterized by high durability as well as resistance to environmental influences. In particular, it has been found for preferred nonwovens of this type that they retain both their mechanical strength and resistance as well as their structural integrity over a period of several years and/or decades, even in the presence of constant air movement.

Figure 12:
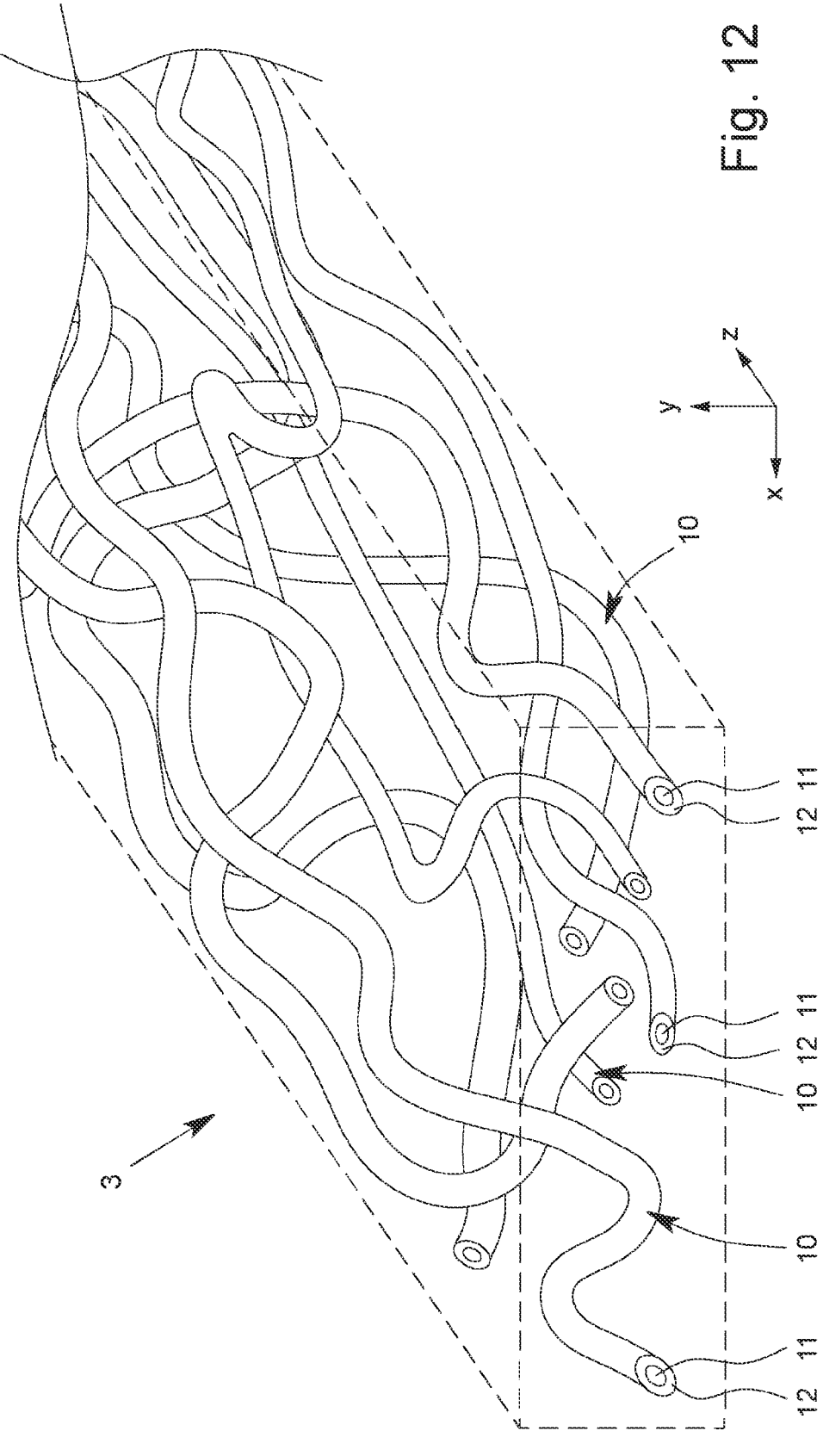
FIG. 12 a schematic cross-sectional view of a portion of a spunbonded nonwoven fabric preferably used in the context of the present invention.

In another preferred embodiment of the present invention, however, the first nonwoven layer 3 and/or the second nonwoven layer 4 can also be designed as a bicomponent fiber nonwoven. A schematic representation of a corresponding exemplary nonwoven layer 3 is shown in FIG. 12.

If the first nonwoven layer 3 and/or the second nonwoven layer 4 is formed as a bicomponent fiber nonwoven, it is usually provided that the bicomponent fiber nonwoven is formed from bicomponent fibers 10, in particular wherein the bicomponent fiber 10 usually has a first component 12 made of a first polymer and a second component 11 made of a second polymer. Preferably, the first and/or second component 11 and/or 12 is selected from thermoplastic polymers.

Figures 10, 11:
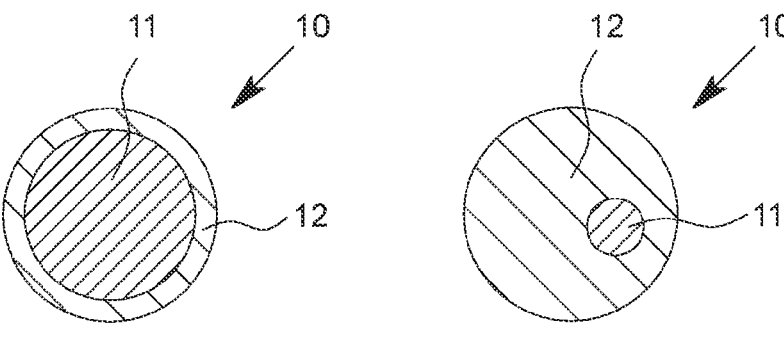
FIG. 10 a schematic cross-sectional view of a bicomponent fiber preferably used in the present invention.
FIG. 11 a schematic cross-sectional view of a bicomponent fiber preferably used in the present invention.

A distinction can be made between different types of bicomponent fibers 10, each having different characteristic distributions of the components in the fiber cross-section. Bicomponent fibers 10 in which the first component 12 surrounds and thus encloses the second component 11 in the cross section of the fiber are referred to as core-sheath fibers and are shown schematically in FIGS. 9 to 11.

As far as the membrane layer 2 of the flat sheet 1 according to the invention is concerned, it is preferred for the latter according to the invention if the membrane layer 2 is waterproof and permeable to water vapor. Furthermore, the membrane layer 2 is designed as a monolithic membrane layer.

With regard to the composition and/or structure of the membrane layer 2, it is provided according to the invention that the membrane layer 2 comprises a thermoplastic elastomer, in particular selected from the group of thermoplastic polyurethanes and/or thermoplastic copolyesters (TPEE).

If the thermoplastic elastomer is selected from the group of thermoplastic polyurethanes, it has further proved useful if the thermoplastic polyurethane is selected from the group of aliphatic and/or aromatic polyurethanes, in particular of the ether type, of the ester type, of the carbonate type and their blends and/or mixtures, in particular the aliphatic and/or aromatic polyurethanes of the ether type, ester type and their mixtures and/or blends, preferably the aliphatic and/or aromatic polyurethanes of the ether type.

Further, in a preferred embodiment, it is provided that the material of the membrane layer 2, in particular the thermoplastic polyurethane, has a proportion of at least 10%, preferably from 15% to 100%, more preferably from 20% to 70%, of material derived from renewable raw materials.

Furthermore, it can also have a beneficial effect on the properties of the membrane layer 2 if the additives are added to it. As in the case of the fibers of the nonwoven layers 3 and 4, the membrane layer 2 can also be stabilized by the addition of selected additives, in particular against external environmental influences, and thus made more resistant to aging.

Good results are also obtained according to the present invention if the membrane layer 2 has a weight per unit area in the range from 10 to 150 $g/m^2$, in particular from 15 to 100 $g/m^2$, preferably 18 to 80 $g/m^2$, preferably 20 to 50 $g/m^2$. Likewise, in a preferred alternative embodiment of the present invention, it may also be provided that the membrane layer 2 has a grammage and/or weight per unit area of less than 100 $g/m^2$. In particular, the weight per unit area may be between 1 and 70 $g/m^2$, more preferably between 3 and 40 $g/m^2$, particularly preferably between 4 and 30 $g/m^2$ and especially between 5 and 25 $g/m^2$.

Figure 2:
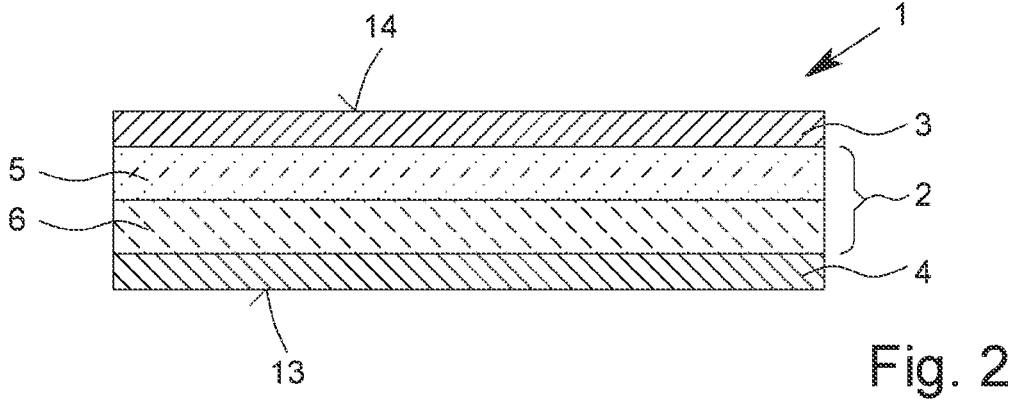
FIG. 2 a schematic cross-sectional view of another flat sheet according to the invention with a two-layer membrane layer.
Figure 3:
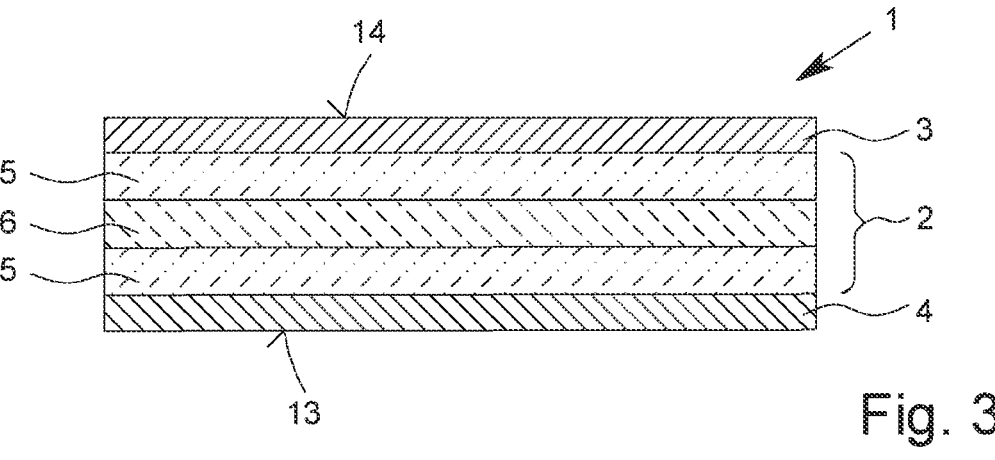
FIG. 3 a schematic cross-sectional view of a further flat sheet according to the invention with a three-layer membrane layer.

As shown schematically in FIGS. 2 and 3, it is provided in a particularly preferred embodiment of the present invention that the membrane layer 2 has at least two layers 5 and 6 of membrane sheet layers. These membrane sheet layers 5 and 6 can be formed differently, or the at least two membrane sheet layers 5 and 6 can be formed at least substantially identically.

In particular, in the case of a three-layer structure of the membrane layer 2 as shown in FIG. 3, the outer membrane sheet layers 5 enclosing a central membrane sheet layer 6 can be of at least essentially identical design. An identical design means in particular that the membrane sheet layers have the same surface properties and/or the same material and/or the same material composition. Ultimately, the identical membrane sheet layers can also be designed to be functionally identical. For example, the weights per unit area of the identically formed membrane sheet layers can differ by less than 5 $g/m^2$ from one another.

In a very particularly preferred embodiment of the present invention, it may be provided that at least one membrane sheet layer 5 or 6 of the membrane layer 2, in particular an outer membrane sheet layer 5, preferably facing the first and/or the second nonwoven layer 3 or 4, has as material thermoplastic copolyester (TPEE) and/or thermoplastic polyurethane (TPU) and/or consists thereof.

Furthermore, in a preferred embodiment of the invention, the membrane layer 5 can be formed from TPEE layers and/or TPU layers and/or from TPEE layers as well as TPU layers. In particular, the TPEE layers and/or the TPU layers and/or the membrane sheet layers 5 and/or 6 of the membrane layer 2 are firmly bonded to one another, in particular inseparably.

A monolithic TPEE membrane is particularly well extrudable and also suitable for thin membranes. In particular, a membrane layer comprising TPEE is suitable for an especially multilayer coextruded sheet and makes sense from a technical point of view. TPU is also intrinsically flame retardant and exhibits good long-term aging behavior, preferably for service lives of more than 10 years.

Preferably, the membrane sheet layers 5 and/or 6 can also have the same or a different proportion of additives, in particular with regard to the relative additive quantity and/or the type or material of the additive and/or additives. In particular, for example in a three-layer membrane structure, at least two membrane sheet layers 5 and/or 6, preferably the outer membrane sheet layers 5, may have the at least substantially same and/or identical material, preferably TPU, with a different additive addition. The additive addition can be shown and/or reflected in a different amount and/or mass of the additive—relative to the volume and/or the area of the membrane sheet layer 5 and/or the total amount—and/or in a different additive composition.

Furthermore, it has proved useful in the context of the present invention if the membrane layer 2 has a layer thickness in the range from 0.01 mm to 2.5 cm, in particular 0.05 mm to 1.5 cm, preferably 0.1 mm to 1 cm.

Figure 4:
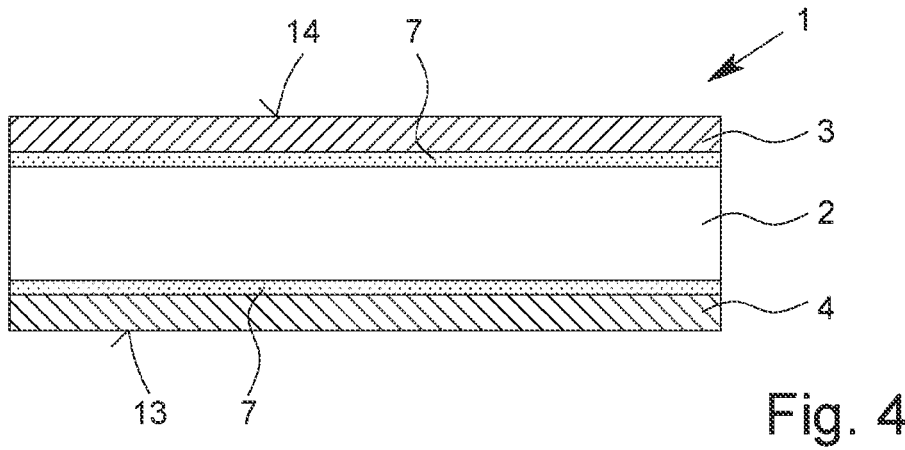
FIG. 4 a schematic cross-sectional view of another flat sheet according to the invention with an additional adhesion promoter layer.

In another preferred embodiment of the present invention, it may be provided for the sheet 1, according to the schematic representation in FIG. 4, that the membrane layer 2 is firmly bonded, preferably glued, to the first nonwoven layer 3 and/or the second nonwoven layer 4.

In this sense, an adhesive layer and/or adhesion promoter layer 7 in particular can be provided between the membrane layer 2 and at least one of the nonwoven layers 3 and/or 4. The bonding of the layers can take place during manufacture, in particular during the extrusion laminating process.

Preferably, the adhesion promoter layer and/or adhesive layer 7 can be used to achieve a material bond between the layers to be joined.

The adhesive and/or adhesion promoter layer 7 can in particular be arranged on the outside of the first nonwoven layer 3, the second nonwoven layer 4 and/or the membrane layer 2. Preferably, an adhesive layer and/or adhesion promoter layer 7 is provided between the membrane layer 2 and the first and/or the second nonwoven layer 3 and/or 4, in particular over the entire surface, preferably for a firm as well as material bond.

The adhesive and/or adhesion promoter layer 7 may further comprise a polymer, in particular an adhesion promoter polymer. The adhesion promoter polymer may thereby preferably be a plastic and/or a synthetic resin, and preferably comprise polyurethane. The adhesion promoter layer is preferably firmly bonded to the membrane layer 2, the first nonwoven layer 3 and/or the second nonwoven layer 4.

Figure 5:
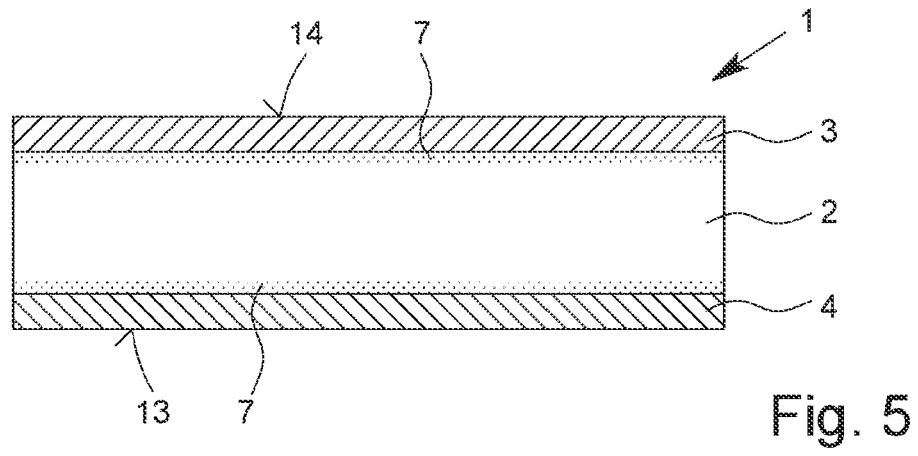
FIG. 5 a schematic cross-sectional view of a further flat sheet according to the invention with an additional adhesion promoter layer.
Figure 6:
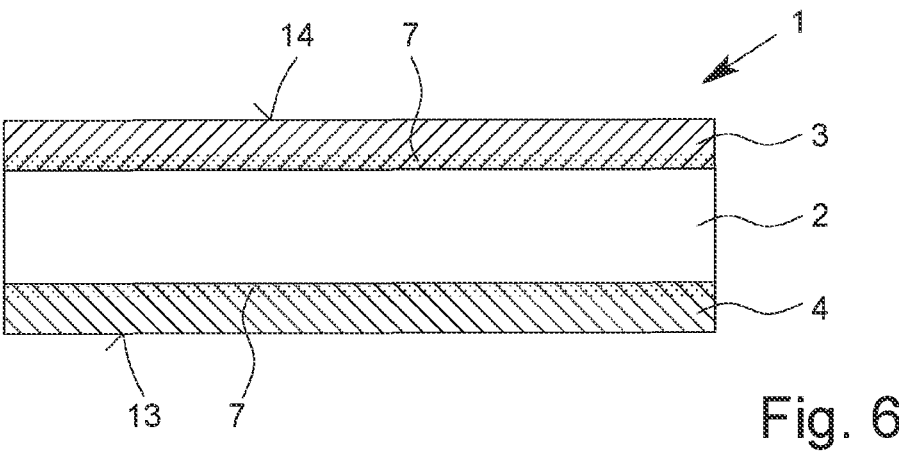
FIG. 6 a schematic cross-sectional view of another flat sheet according to the invention with an additional adhesion promoter layer.

Furthermore, the adhesive and/or adhesion promoter layer 7-as shown in FIGS. 5 and 6-can also be integrated into the first nonwoven layer 3, the second nonwoven layer 4 and/or the membrane layer 2-in such a way that the adhesion promoter polymer is enclosed and/or arranged in the surface region, in particular on the outside, of the aforementioned layers. Thus, the adhesion promoter layer 7 can be formed as part and/or component of the membrane layer 2 and/or the first nonwoven layer 3 and/or the second nonwoven layer 4.

The adhesion promoter layer enables the membrane layer 2 to be firmly bonded to the outer nonwoven layers 3 and/or 4. The adhesion promoter and/or adhesion promoter polymer enables the non-woven layers 3 and 4 to be permanently bonded to the membrane layer 2.

The incorporation of functional materials, for example adhesion promoter polymers and/or flame retardants, into the first and/or second nonwoven layer 3 and/or 4, which is in the form of a nonwoven, can further enable a cost-effective structure of the flat sheet.

By using the adhesion promoter and/or the adhesion promoter polymer and/or the adhesion promoter layer 7 in the outer layer of the first and/or the second nonwoven layer 3 and/or 4, the use of hotmelts can be dispensed with (hotmelt-free bonding). Thus, the adhesion promoter and/or the adhesive can already ensure sufficient bonding and/or adhesion to the membrane layer 2.

However, it may also be advisable to use hot melts in the adhesive and/or adhesion promoter layer 7, in particular reactive hot melts being preferred. The use of hotmelts as adhesion promoters and/or adhesives can have a positive influence on, and/or in particular further increase, the aging resistance and the cold and snow resistance of the films.

Figure 7:
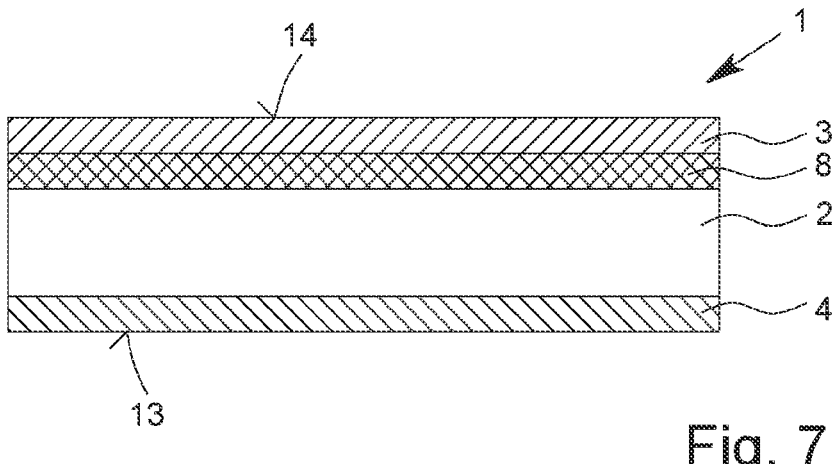
FIG. 7 a schematic cross-sectional view of another flat sheet according to the invention with an additional reinforcing layer.

According to another preferred embodiment of the sheet 1 according to the invention, it may be provided, as shown in FIG. 7, that the sheet 1 comprises at least one reinforcing layer 8.

In particular, it may be provided that the at least one reinforcing layer 8 is arranged between the membrane layer 2 and the first and/or the second nonwoven layer 3 and/or 4. In particular, a reinforcing layer 8 can be arranged in each case between the first nonwoven layer 3 and the membrane layer 2 and between the second nonwoven layer 4 and the membrane layer 2. The reinforcing layer can be designed as a leno fabric and serves in particular to increase the mechanical stability of the flat sheet.

Preferably, the reinforcing layer 8 has and/or consists of a plastic and/or a synthetic resin, preferably a plastic polymer, in particular polypropylene and/or polyethylene and/or polyethylene terephthalate (PET).

WORKING EXAMPLES

1. Production of Spunbonded Nonwovens:

Example 1 (According to the Invention)

A polypropylene (PP) monocomponent fiber nonwoven with a weight per unit area of 30 g/m$^2$ is produced and thermally bonded on a Reifenhauser "Reicofil 3" spunbond line. A PP produced by means of a Ziegler-Natta catalyst is used for this purpose. In addition, an additive masterbatch is added to the PP during extrusion. The masterbatch contains a mixture of a primary and secondary antioxidant and a HALS stabilizer ("Hindered amine light stabilizer"). The spunbond produced contains 0.1 wt. % each of primary and secondary antioxidant and 0.5 wt. % HALS stabilizer

Example 2 (According to the Invention)

On a Reifenhauser spunbond line of the type "Reicofil 4", a PP bicomponent fiber spunbonded nonwoven with a core/sheath structure and a weight per unit area of 60 g/m$^2$ is produced and thermally bonded. For this purpose, a PP produced by means of Ziegler-Natta catalyst is used in the core and a PP produced by means of metallocene catalyst is used in the sheath. The ratio of core: shell is 80:20 wt. %. In addition, an additive masterbatch is added to the respective PP during extrusion. The masterbatch contains a mixture of a primary and secondary antioxidant and a HALS stabilizer. The spunbonded nonwoven produced contains 0.05 wt. % each of primary and secondary antioxidant and 0.25 wt. % HALS stabilizer in the core, and 0.2 wt. % each of primary and secondary antioxidant and 1 wt. % HALS stabilizer in the shell.

2. Mechanical Properties of Spunbonded Nonwovens:

The mechanical properties of the spunbonded nonwovens from Examples 1 and 2 are summarized in the following table:

TABLE 1

| Properties of the spunbonded nonwovens from Ex. 1 and 2 | | | | | |
|---|---|---|---|---|---|
| TS MD [N/5 cm] | TS TD [N/5 cm] | EB MD [%] | EB TD [%] | NPF MD [N] | NPF TD [N] |
| Ex. 1 | 65 | 44 | 61 | 66 | 33 | 39 |
| Ex. 2 | 158 | 137 | 110 | 105 | 99 | 123 |

Legend:
TS = Tensile strength, determined according to DIN EN 12311-1
NPF = Nail pull-out force, determined according to DIN EN 12310-1
EB = Elongation at break
MD = Machine direction
TD = Transverse direction The spunbonded nonwovens obtained according to Examples 1 and 2 are subsequently used to produce flat sheets in the form of composite films according to the invention.

3. Production of Flat Sheets (Composite Films) According to the Invention:

Comparative Example 3 (Not According to the Invention)

A microporous functional membrane with a weight per unit area of 40 g/m$^2$, consisting of 50 wt. % polypropylene and 50 wt. % chalk, is embedded between two polypropyl- ene nonwovens (according to Examples 1 and 2), which have a grammage of about 60 g/m² and 30 g/m², and the layers are joined together by ultrasonic welding.

Example 4 (According to the Invention)

Between two polypropylene nonwovens (according to Examples 1 and 2), which have a grammage of about 60 g/m² and 30 g/m², a functional layer with about 2 g/m² TPU is embedded in an extrusion process. The thermoplastic polyurethane used is aromatic $C_4$-ether TPU. After extru- sion, the layers are laminated together.

Before coating the nonwovens with the functional layer and/or before extrusion, the polypropylene nonwovens are subjected to a corona pretreatment. Subsequently, a melted, non-reactive adhesive (hot melt adhesive) with a coating weight of 5 to 6 g/m² is applied by means of a wide slot nozzle. In each case, the adhesive layer is placed on the carrier layer (polypropylene nonwoven).

The adhesive layer is not applied over the entire surface. In some areas, therefore, the surface of the carrier layer has free spaces that are free of adhesive. These free spaces are caused by the wide slot nozzle in the continuous process and/or, in the case of continuous application of the adhesive, by "tearing". The functional layer is finally bonded between two polypropylene nonwovens in accordance with the above structure.

Example 5 (According to the Invention):

Between two polypropylene nonwovens (both according to Example 2), which have a grammage of about 60 g/m², a functional layer with about 30 g/m² TPU is embedded in an extrusion process. The thermoplastic polyurethane used is aromatic $C_4$-ether TPU. After extrusion, the layers are laminated together.

Before being coated with the functional layer and/or extruded, the polypropylene nonwovens are subjected to a corona pretreatment. Then a melted reactive adhesive (poly- urethane hotmelt adhesive) with a coating weight of 6 g/m² is applied by means of a coating roller (anilox roller). In each case, the adhesive layer is placed on the carrier layer (polypropylene nonwoven).

The adhesive layer is not applied over the entire surface. In some areas, therefore, the surface of the carrier layer has free spaces that are free of adhesive. These free spaces are defined by the engraving of the coating roller. The functional layer corresponding to the aforementioned structure is thus bonded between two polypropylene nonwovens.

Example 6 (According to the Invention)

Between two polypropylene nonwovens (both according to Example 2), which have a grammage of about 60 g/m², a functional layer with about 25 g/m² TPU is embedded in an extrusion process. Aromatic $C_4$-ether TPU is provided as the thermoplastic polyurethane. In addition, a polypropylene leno fabric with a weight of 30 g/m² is embedded at the same time. After extrusion, the layers are laminated together.

Before coating with the functional layer and/or extrusion thereof, the polypropylene nonwovens are subjected to a corona pretreatment in the process and then a melted reac- tive adhesive (polyurethane hotmelt adhesive) with a coating weight of 12 g/m² is applied by means of a coating roll (anilox roll with approx. 20% surface coverage). In each case, the adhesive layer is placed on the carrier layer (polypropylene nonwoven).

The adhesive layer is not applied over the entire surface. In some areas, therefore, the surface of the carrier layer has free spaces that are free of adhesive. These free spaces are defined by the engraving of the coating roller. The functional layer is bonded by the aforementioned structure between two polypropylene nonwovens.

Example 7 (According to the Invention)

Between two polypropylene nonwovens (both according to Example 2), which have a grammage of about 60 g/m², a functional layer with about 25 g/m² TPU is embedded in an extrusion process. Aromatic $C_4$-ether TPU is provided as the thermoplastic polyurethane. In addition, a scrim of polypro- pylene cross-laminate with a weight per unit area of approx. 30 g/m₂ is embedded at the same time.

Before coating with the functional layer and/or extrusion thereof, the polypropylene nonwovens are subjected to a corona pretreatment. Subsequently, a melted reactive adhe- sive (polyurethane hotmelt adhesive) with a coating weight of 8 g/m² is applied by means of a coating roller (screen roller with approx. 20% surface coverage). In each case, the adhesive layer is placed on the carrier layer (polypropylene nonwoven).

The adhesive layer is not applied over the entire surface. In some areas, therefore, the surface of the carrier layer has free spaces that are free of adhesive. These free spaces are defined by the engraving of the coating roller. The functional layer is bonded between two polypropylene nonwovens in accordance with the above structure.

4. Physical and Mechanical Properties of the Sheets:

The $S_d$ value, which indicates the water vapor permeabil- ity, is measured according to DIN EN 12572 (as of February 2019). The water tightness is measured as described in DIN EN 13859-1-2010-11. The dynamic water column is mea- sured according to the same aging procedure as described in DIN EN ISO 811-2018-08. The aging is performed accord- ing to DIN EN 13859-1-2010-11.

The following test results have been determined:

TABLE 2

| Physical properties of the paths from Ex. 3 to 7 | | | | | | |
|---|---|---|---|---|---|
| | Weight | | Before aging | | After aging | |
| | per unit area [g/m²] | $S_d$- value [m] | Water- tightness | Water column [m] | Water- tightness | Water column [m] |
| Cf. ex. 3 | 130 | 0.053 | W1 | 4.4 | W1 | 4.3 |
| Ex. 4 | 120 | 0.071 | W1 | 3.0 | W1 | 3.0 |
| Ex. 5 | 170 | 0.092 | W1 | 6.4 | W1 | 6.3 |
| Ex. 6 | 195 | 0.088 | W1 | 14.4 | W1 | 14.1 |
| Ex. 7 | 190 | 0.082 | W1 | 15.0 | W1 | 14.8 |

A watertightness corresponding to class W1 in the sense of DIN EN 13859-1-2010-11 shall be assigned if the test object, i.e. the sheet to be tested, is tested according to method A of DIN EN 1928-2000-07 with the following modifications Water column height: 200 mm
Coloring of the water with 0.05% eosin
Use of one layer of laboratory filter paper (80 g/m²)

Test duration: 2 h (instead of 24 h)

Feedthrough for three test specimens, is waterproof, i.e. passes the test.

The mechanical properties of sheets and/or laminated films 3 to 7 before and after aging correspond to DIN EN 13859-1-2010-11 and are shown in the following table:

TABLE 3

| | Mechanical properties of the sheets from Ex. 3 to 7 | | | | | | | |
|---|---|---|---|---|---|---|---|---|
| | Before aging | | | | After aging | | | |
| | TF MD [N/ 5 cm] | TF TD [N/ 5 cm] | EB MD [%] | EB TD [%] | TF MD [N/ 5 cm] | TF TD [N/ 5 cm] | EB MD [%] | EB TD [%] |
| Cf. ex. 3 | 205 | 155 | 25 | 52 | 145 | 122 | 20 | 45 |
| Ex. 4 | 220 | 160 | 35 | 67 | 204 | 149 | 37 | 71 |
| Ex. 5 | 290 | 255 | 41 | 73 | 275 | 254 | 40 | 66 |
| Ex. 6 | 475 | 465 | 15 | 16 | 462 | 468 | 14 | 13 |
| Ex. 7 | 505 | 493 | 14 | 17 | 495 | 494 | 13 | 14 |

Legend:
TF = Tearing force
EB = Elongation at break
MD = Machine direction
TD = Transverse direction 5. Hydrolysis Stability of the Sheets:

The permanent hydrolytic stability of the sheets and/or composite films is determined by storing 15×15 cm test specimens in a climatic oven at 70°° C. and a relative humidity of 90%. After 12 and 24 weeks, the water tightness is measured as described in DIN EN 13859-1-2010-11. The dynamic water column is measured according to the same aging procedure as described in DIN EN ISO 811-2018-08.

The following test results have been determined:

TABLE 4

| | Water tightness of the sheets from examples 3 to 7 and water column after aging at 70° C. and 90% relative humidity | | | |
|---|---|---|---|---|
| | Waterproof | | Water column [m] | |
| | 12 weeks | 24 weeks | 12 weeks | 24 weeks |
| Cf. ex. 3 | W1 | W1 | 4.3 | 4.2 |
| Ex. 4 | W1 | W1 | 3.1 | 3.0 |
| Ex. 5 | W1 | W1 | 6.3 | 6.1 |
| Ex. 6 | W1 | W1 | 14.2 | 13.3 |
| Ex. 7 | W1 | W1 | 14.7 | 14.6 |

To determine stability under humid conditions and low temperatures, the composite films and/or sheets according to Examples 3 to 7 will be exposed to outdoor weathering without roofing for 3 months during the winter period (November 2020 to January 2021in Herdecke, Germany).

6. Wet/Cold Stability of the Sheets:

After 3 months, the water tightness is measured as described in DIN EN 13859-1-2010-11. The dynamic water column is measured after outdoor weathering according to DIN EN ISO 811-2018-08. The bond adhesion of the individual layers to each other is also determined.

The following test results have been determined:

TABLE 5

| | Water tightness of the membranes from Ex. 3 to 7 and water column before and after winter outdoor weathering | | | | | |
|---|---|---|---|---|---|---|
| | Waterproof | | Water column [m] | | Composite adhesion | |
| | Start | 3 months | Start | 3 months | Start | 3 months |
| Cf. ex. 3 | W1 | W1 | 4.4 | 4.1 | + | + |
| Ex. 4 | W1 | W1 | 3.0 | 2.1 | + | 0 |
| Ex. 5 | W1 | W1 | 6.4 | 6.3 | ++ | ++ |
| Ex. 6 | W1 | W1 | 14.4 | 14.1 | ++ | ++ |
| Ex. 7 | W1 | W1 | 15.0 | 14.6 | ++ | ++ |

Legend:
++ = very good bond strength
+ = good bond strength
0 = satisfactory bond strength 7. Aging of the Sheets at 70° C. and 5 m/s Air Movement:

The aging tests are performed in an oven according to DIN EN 1296-2001-03 at a temperature of 70±2° C. with a constant air movement of 5±2 m/s. The air exchange rate is at least 10 air changes per hour. 15×15 cm test specimens of the sheets and/or laminated films are stretched in aluminum frames and placed vertically in the oven. The back of the test specimens is covered.

After 8, 16, 32, 48 and 64 weeks, test specimens are removed and water tightness is measured as described in DIN EN 13859-1-2010-11 at a water column of at least 200 mm over a period of 2 h, but in accordance with DIN EN ISO 811-2018-08without a cover plate and at an area of 100 cm$^2$.

The sheets or composite films from examples 3 to 7 are tested. In addition, four commercially available comparative products that are frequently used in practice are also tested. These are the following sheets:

Product A: Braas Divoroll Pro (Manufacturer: Braas-Monier)

Product B: Isocell Omega Mono 200 Duo SK (Manufacturer: Isocell)

Product C: DELTA Vent N (Manufacturer: Dörken)

Product D: Koramic Profi 2S (Manufacturer: Wienerberger)

TABLE 6

| | Watertightness of the sheets from Ex. 3 to 7 and water column after aging at 70° C. and 5 m/s air movement (where f = failed) | | | | | |
|---|---|---|---|---|---|---|
| | Waterproof | | | | | |
| | Start | 8 We. | 16 We. | 32 We. | 48 We. | 64 We. |
| A | W1 | W1 | f | f | f | f |
| B | W1 | W1 | W1 | f | f | f |
| C | W1 | W1 | W1 | f | f | f |
| D | W1 | W1 | W1 | f | f | f |
| Cf. ex. 3 | W1 | W1 | W1 | f | f | f |
| Ex. 4 | W1 | W1 | W1 | W1 | W1 | W1 |
| Ex. 5 | W1 | W1 | W1 | W1 | W1 | W1 |
| Ex. 6 | W1 | W1 | W1 | W1 | W1 | W1 |
| Ex. 7 | W1 | W1 | W1 | W1 | W1 | W1 |

TABLE 6-continued

Watertightness of the sheets from Ex. 3 to 7 and water column after
aging at 70° C. and 5 m/s air movement (where f = failed)

| | Water column [m] | | | | |
|---|---|---|---|---|---|
| | Start | 8 We. | 16 We. | 32 We. | 48 We. | 64 We. |
| A | 5.0 | 0.4 | <0.2 | <0.2 | <0.2 | <0.2 |
| B | 2.3 | 1.0 | 0.7 | <0.2 | <0.2 | <0.2 |
| C | 4.5 | 4.3 | 4.4 | <0.2 | <0.2 | <0.2 |
| D | 14.1 | 9.9 | 6.5 | <0.2 | <0.2 | <0.2 |
| Cf. ex. 3 | 4.4 | 4.4 | 4.2 | <0.2 | <0.2 | <0.2 |
| Ex. 4 | 3.0 | 3.1 | 3.2 | 3.3 | 3.2 | 2.9 |
| Ex. | 6.4 | 6.2 | 5.9 | 5.6 | 5.5 | 5.6 |
| Ex. 6 | 14.4 | 14.4 | 14.1 | 13.9 | 13.2 | 12.9 |
| Ex. 7 | 15.0 | 14.8 | 14.9 | 14.7 | 14.8 | 14.7 |

On the basis of these test results, the advantages of flat sheets and/or composite films according to the present invention can be clearly recognized.

In particular, it can be clearly seen from the above results that sheets according to the invention are characterized by high aging stability, which clearly distinguishes the sheets from similarly constructed sheets of the prior art.

In particular, the studies on aging stability according to the process according to the invention and/or within the scope of what is envisaged for sheets according to the invention impressively show that sheets from the prior art have a significantly lower aging stability than sheets according to the invention, especially when the aspect of air movement is taken into account.

As already mentioned, the air movement factor is neglected in ordinary and/or normative procedures. However, on the basis of the above results it can be clearly seen that air movements can have a strong influence on the condition and/or the stability of a sheet, so that its inclusion in a simulation of the aging behavior of the corresponding sheet is also advantageous. Here, sheets according to the present invention are characterized by a significantly higher aging stability than comparable sheets from the prior art, which fail prematurely under the test conditions.

Particularly in the area where the long-term stability of the sheets is simulated and tested, the comparative sheets show clear weaknesses, whereas sheets according to the present invention continue to be intact and functional, which is confirmed in particular by the fact that the waterproofing of the sheets continues to be very good.

The advantageous properties of sheets according to the invention correlate in particular with the structure of the sheets and/or the choice of material for both the nonwoven layers and the membrane layer.

In addition to the choice of material, a comparatively higher weight per unit area of both the nonwoven layer and the membrane layer can also have a positive effect on the aging stability and other properties of the sheet, e.g. hydrolytic stability and damp- cold stability. Finally, the addition of supporting fabrics and/or scrims makes it possible to provide particularly stable and durable sheet sheets with properties that can be rated as advantageous compared to comparable prior art products.

Furthermore, sheets according to the present invention are also characterized by a high hydrolytic stability as well as weather resistance, in particular also during the winter period. The advantageous properties have a particularly positive effect on the overall durability and resistance of the sheets according to the present invention.

Flat sheets such as those provided by the present invention are preferably suitable for use in the construction sector, in particular as a sarking sheet, underlayment sheet and/or sheathing sheet in a roof structure and/or facade sheet in a wall structure, especially in view of the advantageous mechanical and physical properties of the sheets described.

Particularly with regard to the use of the flat sheet according to the invention in roof structures, the high aging stability of the sheets, even in the presence of strong, sustained air movement, should be emphasized as a clear advantage over the state of the art. In roof constructions in particular, air movements at increased speeds are precisely what is wanted in order, for example, to safely remove moisture from the interior of the building and roof. A sub-roofing membrane or sarking membrane that ages prematurely in the presence of strong air movements cannot provide sufficiently efficient (long-term) protection for the roof and/or building structure.

In contrast, the flat sheet according to the present invention provides a product that remains reliable and functional for a long time even under the most demanding conditions.

LIST OF REFERENCE SIGNS

1 flat sheet
2 membrane layer
3 first nonwoven layer
4 second nonwoven layer
5 membrane sheet layer
6 further membrane sheet layer
7 adhesion promoter layer
8 reinforcement layer
9 monocomponent fiber
10 bicomponent fiber
11 first component
12 second component
13 sheet underside
14 sheet top side

The invention claimed is:

1. A highly aging-resistant flat sheet for the construction sector, the flat sheet comprising:

a multilayer structure comprising at least a first nonwoven layer and a second nonwoven layer; and at least one membrane layer arranged between the first nonwoven layer and the second nonwoven layer, the membrane layer being in the form of a monolithic membrane layer and comprising a thermoplastic elastomer selected from the group consisting of thermoplastic polyurethanes and/or thermoplastic copolyesters (TPEE);

wherein the first and/or the second nonwoven layer having a weight per unit area of between 10 and 150 $g/m^2$;

wherein the first nonwoven layer and the second nonwoven layer are formed as a monocomponent fiber nonwoven;

wherein the material of the monocomponent fiber is selected from the group of polyolefin homopolymers, polyolefin copolymers and their blends and/or mixtures;

wherein an adhesion promoter layer is arranged between the first and the second nonwoven layer and the membrane layer;

wherein the adhesion promoter layer is formed by a reactive polyurethane hot melt adhesive and is applied with a weight per unit area of 2 to 20 $g/m^2$;

wherein the sheet has an aging stability of at least 25 years;

wherein the aging stability is determined by subjecting the sheet to an artificial aging process, wherein the artificial aging process is carried out at a temperature of 70±2° C. and an air velocity of 5±2 m/s;

wherein the artificial aging process for determining the aging stability is carried out over a period of at least 36 weeks;

wherein the time in weeks for performing the artificial aging process is determined by multiplying the number of years for aging stability by a factor of 12 and dividing the obtained product by a value of 4.5, and/or by multiplying the number of years for aging stability by a factor of 2.5; and wherein, following the artificial aging process, the water resistance of the sheet is tested in accordance with DIN EN 13859-1-2010-11, section 5.2.3, against a water column of at least 200 mm over a period of 2 h.

2. The flat sheet according to claim 1, wherein the artificial aging process for determining the aging stability is carried out over a period of at least 40 weeks.

3. The flat sheet according to claim 1, wherein the first nonwoven layer and/or the second nonwoven layer is formed as a spunbonded nonwoven and/or as a needled nonwoven.

4. The flat sheet according to claim 1, wherein the fibers of one or more components comprise one or more polymers from the group of thermoplastics.

5. The flat sheet according to claim 1, wherein the membrane layer has a weight per unit area in the range from 10 to 150 g/m².

6. The flat sheet according to claim 1, wherein the membrane layer has a layer thickness in the range from 0.01 mm to 2.5 cm.

7. The flat sheet according to claim 1, wherein the adhesion promoter layer is applied with a weight per unit area of 4 to 15 g/m².

8. The flat sheet according to claim 1, wherein the sheet is permeable to water vapor, open to diffusion, windproof, rainproof and/or water-repellent and/or waterproof, and wherein the sheet has an $S_d$ value tested according to DIN EN 12572, as of February 2019, of less than or equal to 0.5 m.

9. A method for working on a roof structure and/or a wall structure, the method comprising using the flat sheet of claim 1 as a sarking sheet, underlayment sheet and/or sheathing sheet in the roof structure and/or as a facade sheet in the wall structure, respectively.

10. A method of producing the flat sheet of claim 1, the flat sheet comprising a multilayer structure comprising at least a first nonwoven layer and a second nonwoven layer and at least one membrane layer arranged between the nonwoven layers, and the flat sheet having an ageing stability of at least 15 years, the method comprising:

extruding the at least one membrane layer between the at least first and second nonwoven layers and laminating the membrane and nonwoven layers immediately thereafter;

wherein adhesion promoter layers are applied on the nonwoven layers, and wherein the extrusion of the membrane layer is then performed on the adhesion promoter layers applied to the nonwoven layers.

11. The flat sheet according to claim 4, wherein the fibers of one or more components comprise one or more polymers from the group of polyolefins, polyesters, polyamides, thermoplastic polyurethanes and/or mixtures thereof.

12. The flat sheet according to claim 4, wherein the fibers of one or more components comprise one or more polymers from the group of polyolefins, polyesters, thermoplastic polyurethanes and/or mixtures thereof.

* * * * *